United States Patent
Medvedev et al.

(10) Patent No.: US 12,428,304 B2
(45) Date of Patent: Sep. 30, 2025

(54) SYSTEM AND METHOD OF NANOCARBON MATERIALS MANUFACTURING BY PULSE ELECTRIC DISCHARGE IN LIQUID

(71) Applicant: NANOPRO TECHNOLOGIES LTD., Tal Aviv-Yafo (IL)

(72) Inventors: Dmitry Medvedev, Moscow (RU); Mikhail Marin, Moscow (RU); Evgeny Gorelik, Moscow (RU); Boris Mislavsky, Moscow (RU); Roman Iliev, Moscow (RU)

(73) Assignee: NANOPRO TECHNOLOGIES LTD., Tel Aviv-Jaffa (IL)

( * ) Notice: Subject to any disclaimer, the term of this patent is extended or adjusted under 35 U.S.C. 154(b) by 898 days.

(21) Appl. No.: 17/596,185

(22) PCT Filed: Jun. 5, 2020

(86) PCT No.: PCT/IB2020/000421
§ 371 (c)(1),
(2) Date: Dec. 3, 2021

(87) PCT Pub. No.: WO2020/245650
PCT Pub. Date: Dec. 10, 2020

(65) Prior Publication Data
US 2022/0234899 A1    Jul. 28, 2022

Related U.S. Application Data

(60) Provisional application No. 62/858,554, filed on Jun. 7, 2019.

(51) Int. Cl.
*B01J 19/08* (2006.01)
*C01B 32/184* (2017.01)
*C01B 32/26* (2017.01)

(52) U.S. Cl.
CPC ............. *C01B 32/26* (2017.08); *B01J 19/088* (2013.01); *C01B 32/184* (2017.08);
(Continued)

(58) Field of Classification Search
CPC ....... C01B 32/26; C01B 32/184; C01B 32/25; C01B 32/15; B01J 9/088; B01J 19/088;
(Continued)

(56) References Cited

U.S. PATENT DOCUMENTS

| 4,013,525 A | 3/1977 | Emsley |
| 2017/0218243 A1 | 8/2017 | Song et al. |

FOREIGN PATENT DOCUMENTS

| CN | 103261563 A | 8/2013 |
| EP | 2 090 678 A1 | 8/2009 |

(Continued)

OTHER PUBLICATIONS

International Search Report with Written Opinion of corresponding International Application PCT/IB2020/000421, mailed on Sep. 30, 2020.

(Continued)

*Primary Examiner* — Anthony J Zimmer
(74) *Attorney, Agent, or Firm* — The Roy Gross Law Firm, LLC; Roy D. Gross

(57) ABSTRACT

A system for manufacturing a nanomaterial may include a first electrode; a second electrode spaced apart from the first electrode by a gap; and a chamber configured to enclose the first electrode, the second electrode, and a liquid. The system may also include a power supply configured to provide electrical energy to at least one of the first electrode and the second electrode; and a pump configured to cause the liquid to flow through the gap between the first electrode and the second electrode.

28 Claims, 20 Drawing Sheets

(52) U.S. Cl.
CPC ...... *C01P 2002/84* (2013.01); *C01P 2002/85* (2013.01); *C01P 2004/04* (2013.01); *C01P 2004/64* (2013.01)

(58) Field of Classification Search
CPC .............. C01P 2002/84; C01P 2002/85; C01P 2004/04; C01P 2004/64; C25B 9/00; B82Y 40/00
USPC ........................................................ 423/446
See application file for complete search history.

(56) References Cited

FOREIGN PATENT DOCUMENTS

| KR | 20180113697 A | * | 10/2018 | ............. | C01B 32/23 |
|---|---|---|---|---|---|
| WO | WO 2012/058410 A2 | | 5/2012 | | |

OTHER PUBLICATIONS

Genki Saito et al., "Nanomaterial Synthesis Using Plasma Generation in Liquid", *Journal of Nano materials.* vol. 2015, Jan. 1, 2015, pp. 1-21.

D. Berman et al., "Macroscale Superlubricity Enabled by Graphene Nanoscroll Formation", *Science*, vol. 348, No. 6239, Jun. 5, 2015, pp. 1118-1122.

Trofimuk, Andrei D et al. "Effective Method for Obtaining the Hydrosols of Detonation Nanodiamond with Particle Size < 4 nm." *Materials* (Basel, Switzerland) vol. 11,8 1285. Jul. 25, 2018, doi:10.3390/ma11081285.

E.A.Skryleva, et al., "XPS Characterization Onion-Like Carbon from Nanodiamonds and Carbon Structure from Onion-Like Carbon after High-Pressure High-Temperature Treatment", *Fullerenes, Nanotubes, and Carbon Nanostructures*, 20:4-7, 459-462, May 14, 2012.

Raty JY., Galli G. in 2005 "Structural and Electronic Properties of Isolated Nanodiamonds", NATO Science Series (Series II: Mathematics, Physics and Chemistry), vol. 192. Springer, Dordrecht.

Yurjev, G.S., "*Structure Analysis of Detonation Nanodiamond Inclusive of Core/Shell Hybrids*," in Shota Shimizu (Ed.), Diamond and Related Materials Research, New York: Nova Science Publ., Inc., 2008, pp. 151-179).

* cited by examiner

SYSTEM AND METHOD OF NANOCARBON MATERIALS MANUFACTURING BY PULSE ELECTRIC DISCHARGE IN LIQUID

RELATED APPLICATION

The present application is a 371 National Stage Application of International Application No. PCT/IB2020/000421, filed on Jun. 5, 2020, which claims priority to U.S. Provisional Application No. 62/858,554, filed on Jun. 7, 2019. The contents of these applications are incorporated herein by reference in their entireties.

TECHNICAL FIELD

The present disclosure generally relates to nanomaterial manufacturing and, more particularly, to systems and methods of nanomaterial manufacturing by pulse electric discharge in liquid.

BACKGROUND

Nanomaterials include carbon nanoparticles (e.g., nanodiamonds or fullerenes) and may be used in many industries, such as electronics, chemical, construction, medicine, or the like. Nanodiamond forms part of the carbon nanomaterial family which, along with fullerenes and nanotubes, has attracted great interest in recent years due to its potential, in certain cases, for offering exceptional mechanical, optical, surface and biocompatibility properties. Exhibiting the outstanding bulk properties of diamond, but in the form of a nanoscale film or nanoscale particles makes nanodiamond an inexpensive, but potentially high-performance option for many applications, such as reinforcing polymer fillers and materials for additive manufacturing, antifriction additives to oil and lubricants, additives in coatings, delivery or contrast agents for bio-medicine, fine polishing abrasives, catalysts in chemistry and power applications, or the like.

One way to synthesize nanomaterials (including nanodiamonds) is by detonation in a closed chamber filled with ice or inert gas as coolant. The diamond yield (up to 90%) after detonation depends on the synthesis conditions, especially on the heat capacity of coolant. For separation and purification, the detonation products need to be boiled in nitric acid.

Such processes, however, may be associated with significant challenges that may limit industrial applications for nanomaterials. One challenge is that many nanomaterials may have high manufacturing costs and may involve polluting byproducts and/or hazardous processes. For example, to convert nanodiamonds from a dry-powder form to a suspension (also referred to as "dispersion") form, the nanodiamonds may be dispersed in liquid. Nevertheless, the cost of dispersing purified nanodiamonds in liquid may be significantly higher than the cost of generating nanodiamond powder (e.g., by explosion).

Another challenge potentially associated with nanomaterial and/or nanodiamond production is that it may be difficult or expensive to homogenize (e.g., to uniformly disperse) nanomaterials within other substances. In some cases, nanodiamond particles may have a tendency to coagulate or conglomerate, especially when dry powder nanoparticles are intermixed with liquid.

A third challenge in nanomaterial and/or nanodiamond production is that it may be difficult to manipulate the size of the particles (e.g., further reduce the size of the particles) of the nanomaterials after generation. For example, a typical size of nanodiamonds generated by explosion may be 5 nanometers (nm), which (for comparison) is still larger than the 1 nm nanodiamonds observed in meteorites (e.g., with one or more graphene caps on a crystalline surface). Such nanodiamond particle sizes around 1 nm are not known to naturally exist on Earth. Certain manufacturing technologies may be employed for reducing the size of nanodiamonds (or other nanomaterials). Such technologies may include etching the nanodiamonds in oxygen. Such processes, however, may be difficult or impractical for industrial use.

Therefore, a need exists to lower the manufacturing cost of nanomaterials, to homogenize nanomaterial particles with liquid, and to reduce the size of the nanomaterial particles for wider industrial applications of nanomaterials. The presently disclosed technology aims to address these and other challenges.

SUMMARY

One aspect of the present disclosure is directed to a system for manufacturing a nanomaterial. The system may include a first electrode; a second electrode spaced apart from the first electrode by a gap; and a chamber configured to enclose the first electrode, the second electrode, and a liquid. The system may also include a power supply configured to provide electrical energy to at least one of the first electrode and the second electrode; and a pump configured to cause the liquid to flow through the gap between the first electrode and the second electrode.

Another aspect of the present disclosure is directed to a method for manufacturing a nanomaterial. The method may include filling a chamber with a liquid, the chamber enclosing a first electrode and a second electrode, setting a parameter of a power supply electrically coupled to the first electrode and the second electrode, controlling a flow velocity of the liquid during a production stage of a plurality of carbon particles, the carbon particles being generated by a plasma pulse in a gap between the first electrode and the second electrode, and removing a dispersion of the plurality of carbon particles from the chamber.

Other embodiments may include a fabricated material including carbon nanoparticles, where each of the carbon nanoparticles includes a diamond core; and at least one graphene cap on a surface of the diamond core, wherein an average size of the carbon nanoparticles is between 0.5 nanometers and 3 nanometers.

Other systems and methods are also discussed herein.

DETAILED DESCRIPTION

Figure 1:
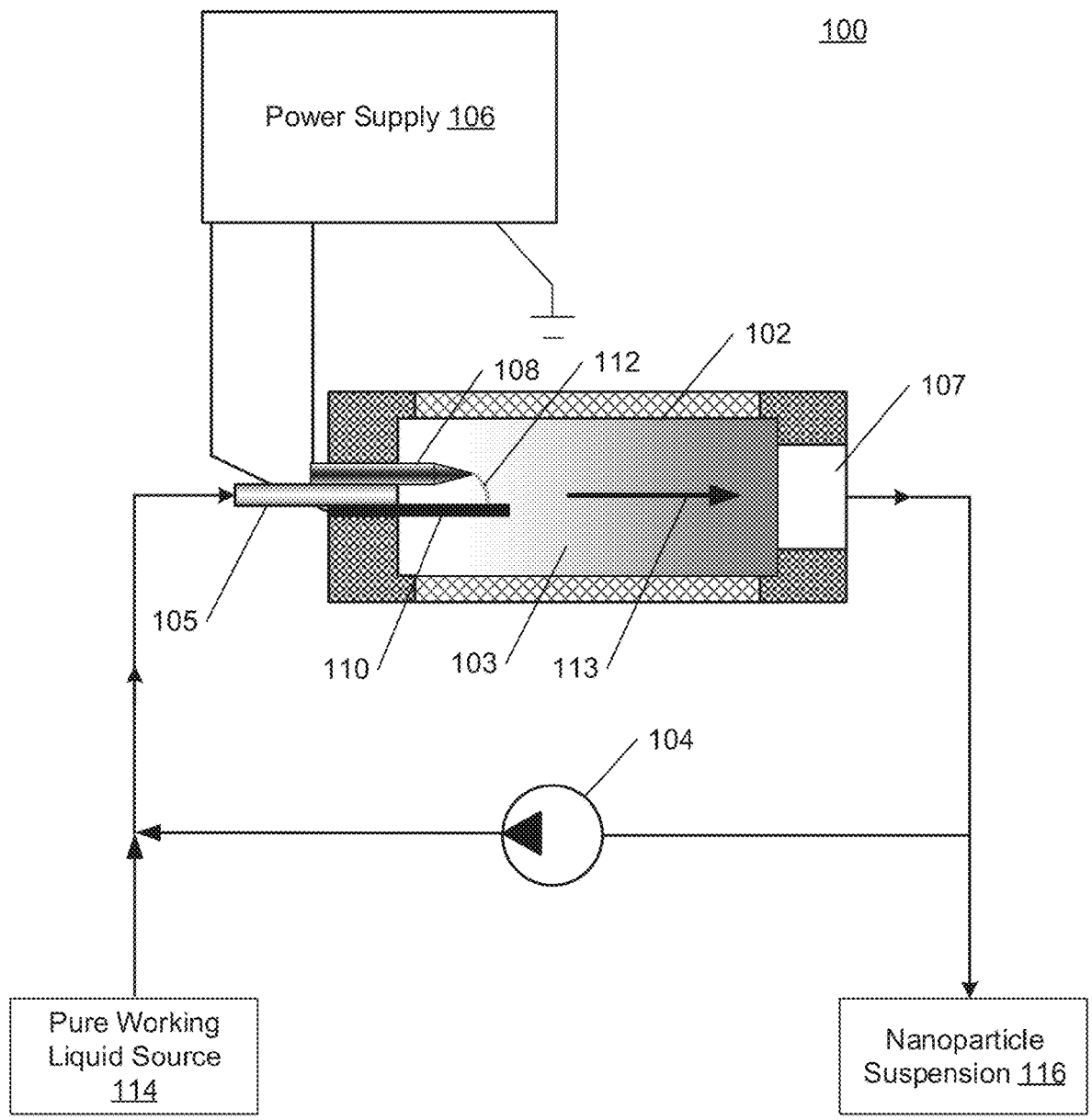
FIG. 1 is a schematic diagram illustrating an example system for manufacturing nanomaterials, consistent with the disclosed embodiments.

This disclosure describes systems and methods of manufacturing nanomaterials by pulse electric discharge in liquid. In some embodiments, a plasma system may be used for creating electric pulse discharge in liquid. For example, short plasma pulses may be discharged in a liquid dielectric to generate nanoparticles as a dispersion, which may be directly intermixed with other substances without causing coagulation or conglomeration. In some embodiments, the plasma system may use controllable and adjustable parameters that are selected for generating nanoparticles (e.g., nanodiamonds, carbon onions, or a fullerene mixture) with nanoscale sizes and optical and mechanical features. The produced nanoparticles may have a size of about 1 nanometer (nm) (e.g., an average particle size between about 0.5 nm and 1.5 nm). The produced nano materials may have many practical applications, such as in lubricant, paint, polishing, plastic modification, surface modification and coating, solar panel modification, medical use, or the like.

Before explaining certain embodiments of the disclosure in detail, it is to be understood that the disclosure is not limited in its application to the details of construction and to the arrangements of the components set forth in the following description or illustrated in the drawings. The inventive concepts may include embodiments in addition to those described and of those being practiced and carried out in various ways. Also, it is to be understood that the phraseology and terminology employed herein, as well as in the accompanying drawings, are for the purpose of description and should not be regarded as limiting. As such, those skilled in the art will appreciate that the conception upon which this disclosure is based may readily be utilized as a basis for designing other structures, methods, and systems for carrying out the several purposes of the present disclosure.

Reference will now be made in detail to the present example embodiments of the disclosure, examples of which are illustrated in the accompanying drawings. Wherever possible, the same reference numbers will be used throughout the drawings to refer to the same or like parts.

FIG. 1 is a schematic diagram illustrating an example system 100 for manufacturing nanomaterials, consistent with disclosed embodiments. In FIG. 1, system 100 includes a reactor chamber 102, a circulation pump 104, and a power supply 106. Reactor chamber 102 may be filled with working liquid 103 (e.g., a dielectric liquid). For example, working liquid 103 may include an organic liquid (e.g., xylene, o-xylene, benzene, ethanol, or the like). Inside reactor chamber 102, a high-voltage electrode 108 and a grounding electrode 110 may be immersed inside the working liquid 103 with a gap and may be connected to power supply 106. Power supply 106 may generate a pulse voltage or current and output it to high-voltage electrode 108 and grounding electrode 110. In some embodiments, power supply 106 may have adjustable parameters and frequency for generating the pulse voltage or current.

High-voltage electric pulses 112 (e.g., dielectric breakdown or plasma pulses) may be discharged between high-voltage electrode 108 and grounding electrode 110 through working liquid 103. High-voltage electric pulses 112 may cause an electrochemical reaction in working liquid 103, by which nanoparticles (e.g., nanocarbon particles) may be generated and dispersed in working liquid 103. In some embodiments, the gap between high-voltage electrode 108 and grounding electrode 110 may be adjustable (e.g., 0.3 to 3 millimeters or "mm").

Circulation pump 104 may inject working liquid 103 into reactor chamber 102 via an inlet 105 and may cause working liquid 103 to flow along direction 113 inside reactor chamber 102. In some embodiments, when operating, circulation pump 104 may inject a certain amount of pure working liquid (e.g., including no nanoparticles) from pure working liquid source 114 to reactor chamber 102 via inlet 105. Circulation pump 104 may control a flow velocity of working liquid 103 inside reactor chamber 102. In some embodiments, in a "continuous mode," circulation pump 104 may continuously inject working liquid 103 into reactor chamber 102 via inlet 105, and generated nanoparticles may be continuously discharged out of reactor chamber 102 via an outlet 107 in a form of a nanoparticle suspension 116 (e.g., a mixture of un-reacted working liquid 103 and the generated nanoparticles). In the continuous mode, concentration of nanoparticle suspension 116 (e.g., proportions of the generated nanoparticles in the mixture) may be controlled by adjusting (e.g., by circulation pump 104) the flow velocity of working liquid 103 inside reactor chamber 102. In some embodiments, in an "intermittent mode," circulation pump 104 may intermittently inject working liquid 103 into reactor chamber 102 via inlet 105, and generated nanoparticles may be intermittently discharged out of reactor chamber 102 via outlet 107 in a form of nanoparticle suspension 116. In the intermittent mode, the concentration of nanoparticle suspension 116 may be controlled by setting a rest time (e.g., a time interval during when circulation pump 104 is not injecting working liquid 103 into reactor chamber 102) for working liquid 103 in reactor chamber 102.

For either the continuous mode or the intermittent mode, the concentration of nanoparticle suspension 116 may be controlled by a liquid treatment time (e.g., an amount of time the working liquid is subjected to a plasma discharge caused by application of electrical energy to the electrodes, including electrode 108). The concentration of nanoparticle suspension 116 may further be controlled by varying a power associated with the input of high-voltage electric pulses 112. For example, when the power of the input of high-voltage electric pulses 112 is 200 watts, system 100 may generate nanomaterials at an hourly capacity of up to about 2 grams. In some embodiments, a power of the high-voltage electric pulses 112 may be greater than or equal to 1 megawatt (MW). In some embodiments, a pulse duration of the high-voltage electric pulses 112 may be greater than or equal to 10 nanoseconds and smaller than or equal to 40 nanoseconds. In some embodiments, a pulse frequency of the high-voltage electric pulses 112 may be greater than or equal to 100 Hz.

To control the generation of nanoparticles in working liquid 103, the gap between high-voltage electrode 108 and grounding electrode 110 may be configured to remain substantially constant. In some embodiments, at least one of high-voltage electrode 108 or grounding electrode 110 may have a shape of an elongate member (e.g., a needle or rod) that may be parallel to another electrode. For example, high-voltage electrode 108 may include an elongate member, and grounding electrode 110 may include a flat member (e.g., a pad or plate) parallel to the elongate member. In another example, grounding electrode 110 may include an elongate member, and high-voltage electrode 108 may include a flat member parallel to the elongate member.

Figure 2A:
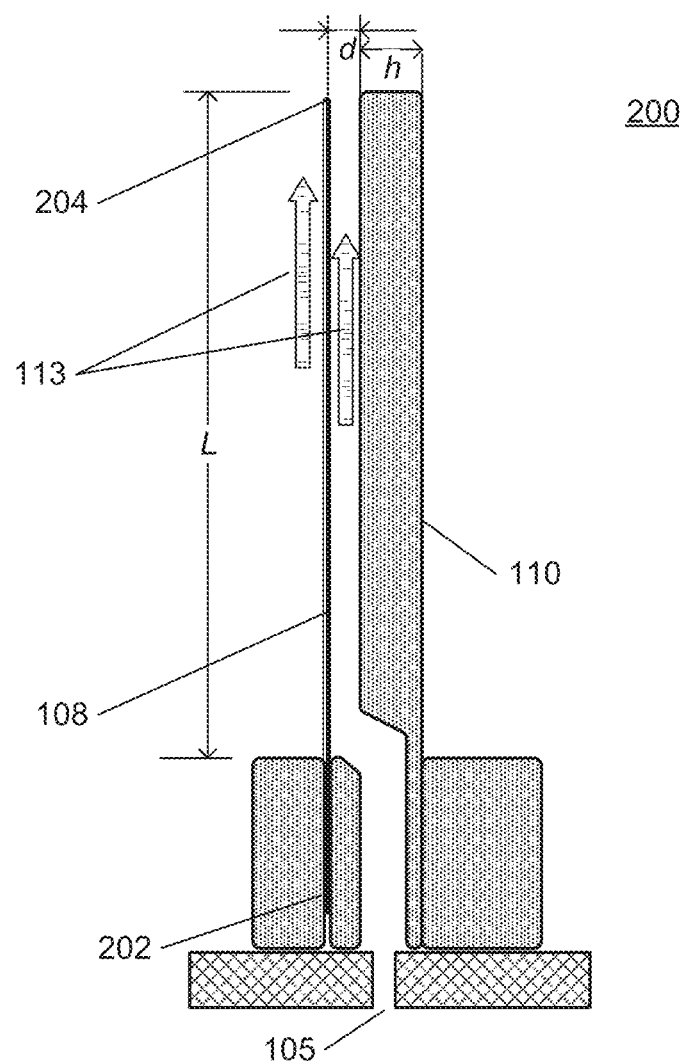
FIGS. 2A-2B are schematic diagrams illustrating an example electrode configuration for manufacturing nanomaterials, consistent with disclosed embodiments.
Figure 2B:
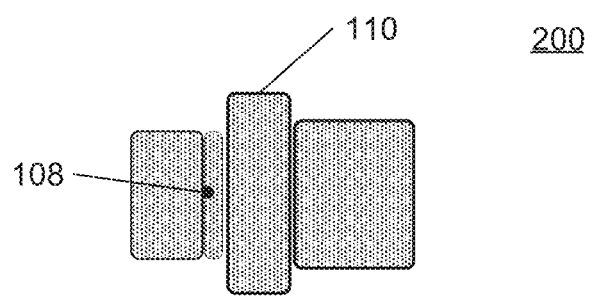

FIGS. 2A-2B are schematic diagrams illustrating an example electrode configuration 200 for manufacturing nanomaterials, consistent with disclosed embodiments. In FIG. 2A, high-voltage electrode 108 is an elongate member that is fixed at a first end 202, and a second end 204 (e.g., a free end) of high-voltage electrode 108 extends toward direction 113 for a length L (e.g., 30 mm, 35 mm, 40 mm, or any other suitable length). Grounding electrode 110 is a flat member (e.g., with a thickness h, such as 3 mm, 4 mm, or any other suitable thickness) that also extends toward direction 113. Grounding electrode 110 may be substantially parallel to high-voltage electrode 108. A gap between high-voltage electrode 108 (e.g., including second end 204) and grounding electrode 110 may have a distance d (e.g., 2 mm, 3 mm, or any other suitable spacing). FIG. 2A is a side view of electrode configuration 200, and FIG. 2B is a top view (e.g., looking along direction 113) of electrode configuration 200. As shown in FIG. 2B, high-voltage electrode 108 includes only one elongate member in electrode configuration 200.

Figure 2C:
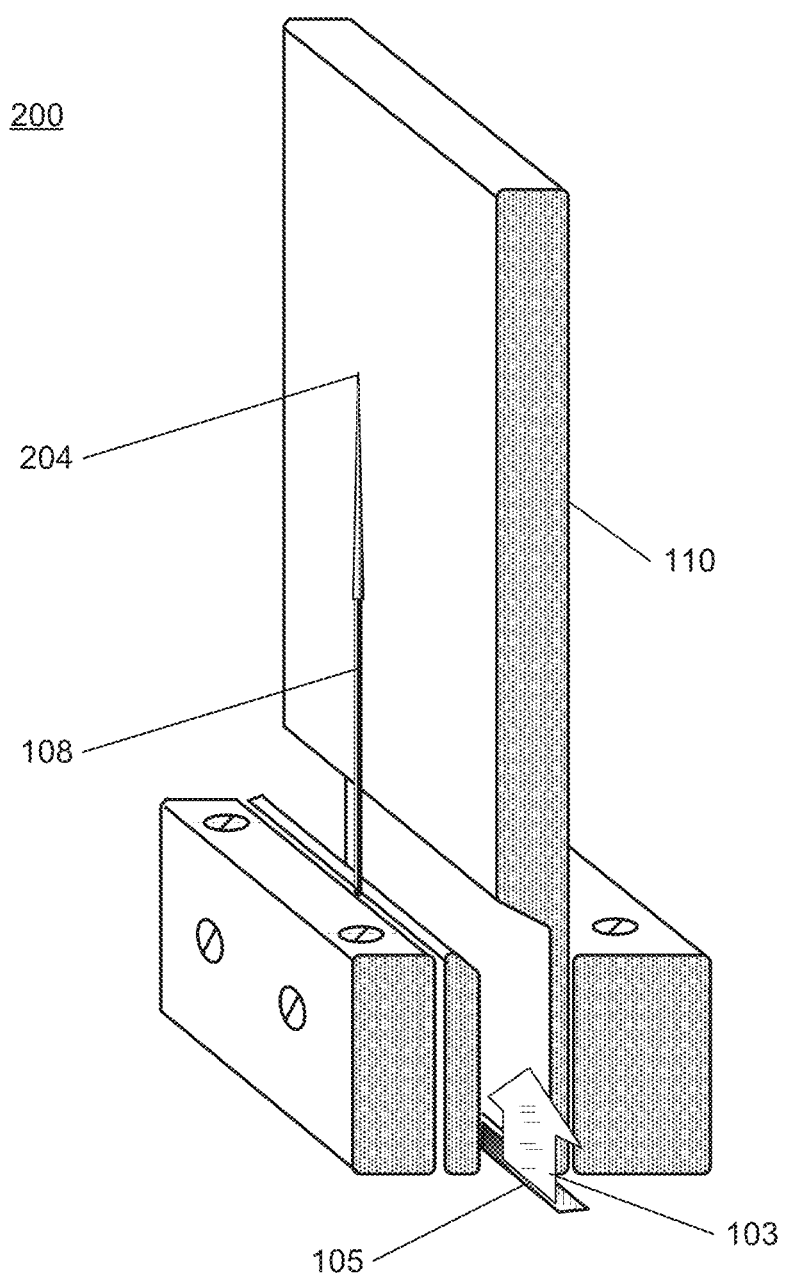
FIG. 2C is a schematic diagram illustrating an eroding electrode in the electrode configuration of FIGS. 2A-2B, consistent with disclosed embodiments.

In some embodiments, high-voltage electric pulses 112 may be discharged between second end 204 of high-voltage electrode 108 and grounding electrode 110. Such pulses 112 may result from the application of electrical energy to one or both of electrodes 108 and 110. To facilitate pulses 112 forming at second end 204 of high-voltage electrode 108, the high-voltage electrode 108 may be configured such that an electric field (resulting from applied electrical energy) may reach a maximum at second end 204. In some cases, as discharging through pulses 112 continues, high-voltage electrode 108 may be worn or eroded from second end 204, in which the length L may decrease. FIG. 2C is a schematic diagram illustrating an eroding high-voltage electrode 108 in electrode configuration 200, consistent with disclosed embodiments. In FIG. 2C, second end 204 of high-voltage electrode 108 has eroded, and the length of the extension of high-voltage electrode 108 is shorter than L in FIG. 2A. However, because high-voltage electrode 108 and grounding electrode 110 are parallel, the distance d of the gap may remain constant even if the length L decreases.

In electrode configuration 200, because the distance d of the gap may remain constant, the energy of high-voltage electric pulses 112 and other parameters (e.g., parameters optimized for nanoparticle generation) may also remain stable during the generation of nanoparticles. Also, because high-voltage electrode 108 is an elongate member, such a geometry may extend the life of high-voltage electrode 108 (e.g., ending when L becomes substantially 0). Further, when high-voltage electrode 108 erodes at second end 204, metal nanoparticles may escape from second end 204, and the metal nanoparticles may serve as catalyst for nanoparticle generation. For example, if high-voltage electrode 108 includes iron, iron nanoparticles escaping from second end 204 during pulse discharge events, for example, may boost generation of nanodiamonds from working liquid 103 (e.g., an organic liquid such as xylene).

Figure 2D:
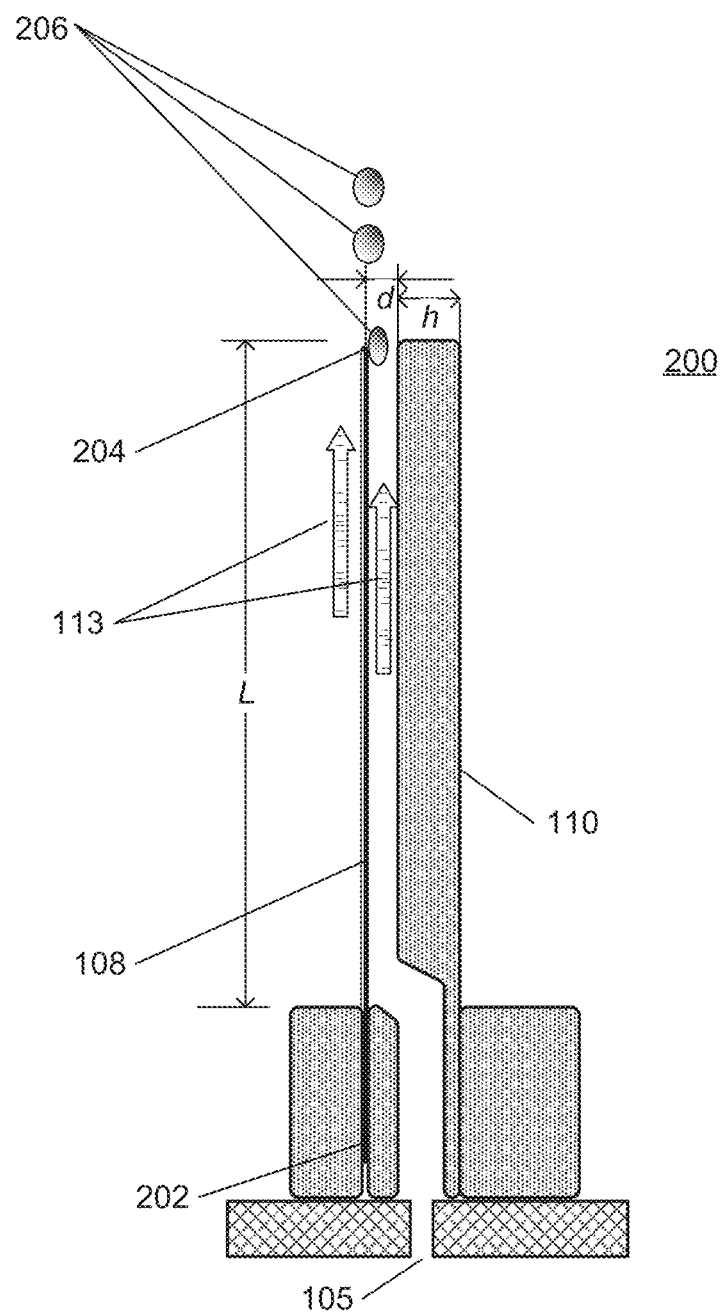
FIG. 2D is a schematic diagram illustrating gas bubbles generated in the electrode configuration of FIGS. 2A-2B, consistent with disclosed embodiments.

In some embodiments, when high-voltage electric pulses 112 are discharged in working liquid 103, gas bubbles (e.g., hydrogen from organic liquid pyrolysis) may be generated. FIG. 2D is a schematic diagram illustrating gas bubbles generated in electrode configuration 200, consistent with the disclosed embodiments. In FIG. 2D, multiple bubbles 206 are generated near second end 204. A bubble generated by a previous pulse discharge may alter a discharging condition for a next pulse discharge because a breakdown voltage for gas is generally lower than a breakdown voltage for liquid. For example, if a bubble generated by a previous pulse discharge remains at the same place until the next pulse discharge occurs, the breakdown voltage for the next pulse discharge may drop because the next pulse discharge may have dielectric breakdown in gas rather than in liquid. Such bubbles, and their motion characteristics, may affect (e.g., limit) a frequency at which pulse discharge events may occur. The slower the bubbles are to migrate away from the pulse discharge sites, the lower the frequency of pulse discharge that may be used for effective particle generation. Thus, bubble movement characteristics can, in some cases, be a limiting factor in the capacity of nanoparticle generation.

To facilitate removal of bubbles from a pulse discharging zone (e.g., near second end 204), direction 113 may be selected as a flow direction of working liquid 103 from a fixed end (e.g., first end 202) to a free end (e.g., second end 204) of high-voltage electrode 108, as shown in FIG. 2A, and a pump may be used to cause a flow of working liquid 103 along direction 113. In some embodiments, if the flow velocity of working liquid 103 (e.g., controlled by circulation pump 104 in FIG. 1) is sufficiently high, the bubbles generated by the previous pulse discharge at the pulse discharging zone may be carried away by working liquid 103 before the next pulse discharge occurs, and thus the discharging conditions for each next pulse discharge may remain substantially the same as for previous pulse discharges. By flowing the working liquid and carrying produced bubbles away from the pulse discharge region, the frequency of repeating the pulse discharges may be increased, and thus the production capacity of nanoparticle generation may also be increased.

Figure 3A:
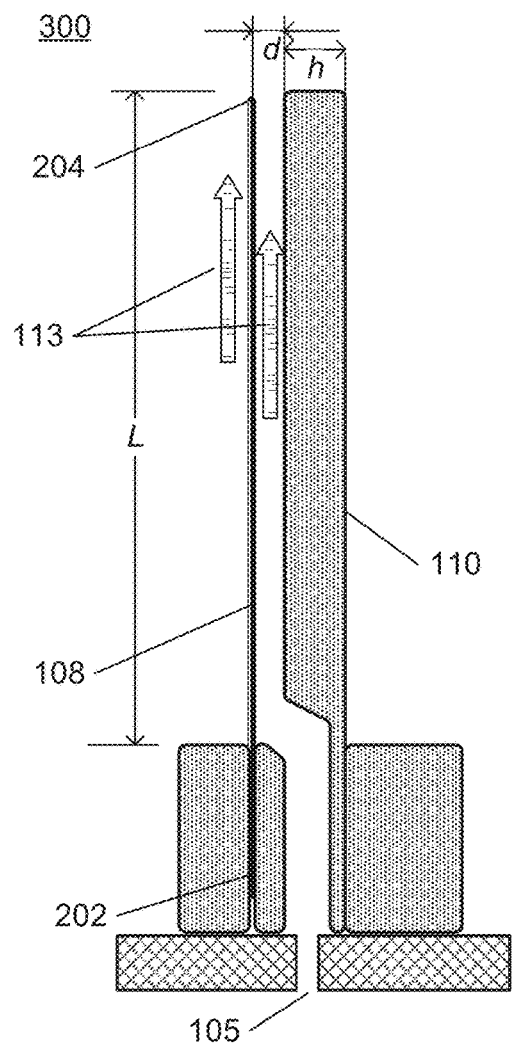
FIGS. 3A-3C are schematic diagrams illustrating another example electrode configuration for manufacturing nanomaterials, consistent with disclosed embodiments.
Figure 3B:
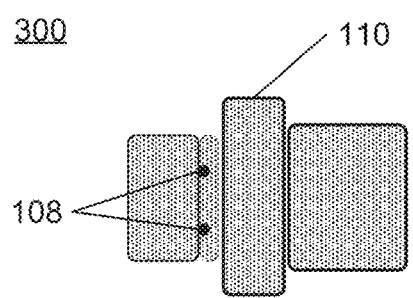
Figure 3C:
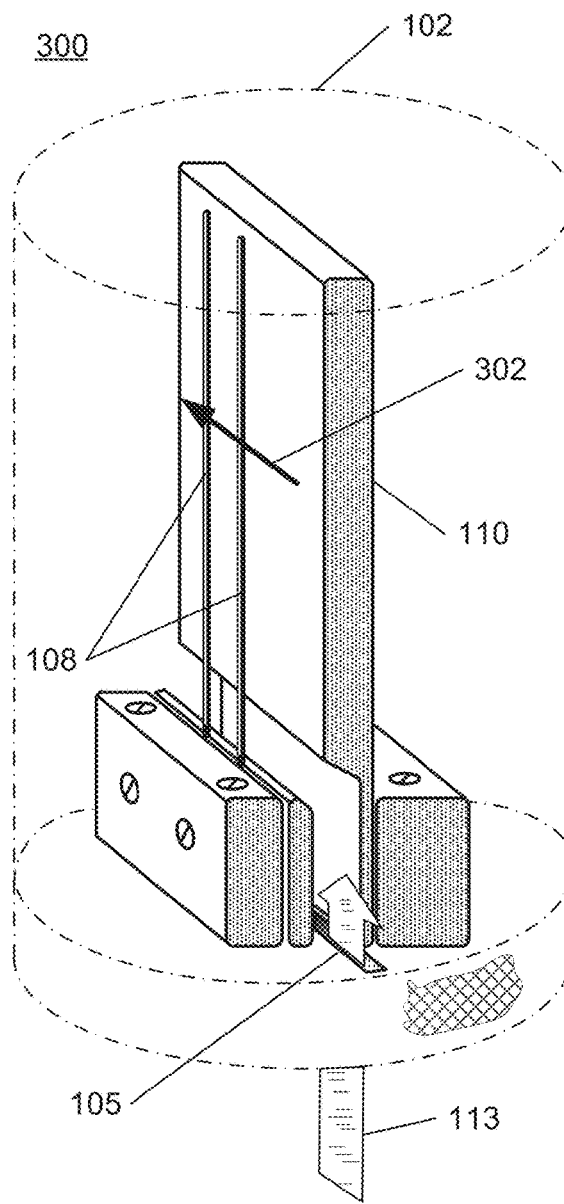

In some embodiments, high-voltage electrode 108 may include more than one elongate member. FIGS. 3A-3C are schematic diagrams illustrating an example electrode configuration 300 for manufacturing nanomaterials, consistent with disclosed embodiments. As shown in FIGS. 3A-3B, electrode configuration 300 may be similar to electrode configuration 200 except that high-voltage electrode 108 includes two elongate members (e.g., two rods). For example, the two elongate members may have similar geometric parameters (e.g., the length L, the distance d, or the like). In some embodiments, by providing two elongate members, high-voltage electrode 108 may increase its life of service and capacity for nanoparticle generation. FIG. 3A may be a side view of electrode configuration 300, and FIG. 3B may be a top view (e.g., looking against direction 113) of electrode configuration 300.

As shown in FIG. 3C, electrode configuration 300 may be enclosed in reactor chamber 102 that has a cylindrical geometry. The two elongate members of high-voltage electrode 108 may be fixed near the bottom of reactor chamber 102. In some embodiments, for more uniform electrode erosion of electrode configuration 300 and higher repetition frequency of pulse discharging, working liquid 103 may be caused to flow in a secondary direction 302 in addition to direction 113 (e.g., the fluid flow may exhibit flow direction components along both of directions 302 and 113) to boost dielectric breakdown between the two elongate members of high-voltage electrode 108.

Figure 4B:
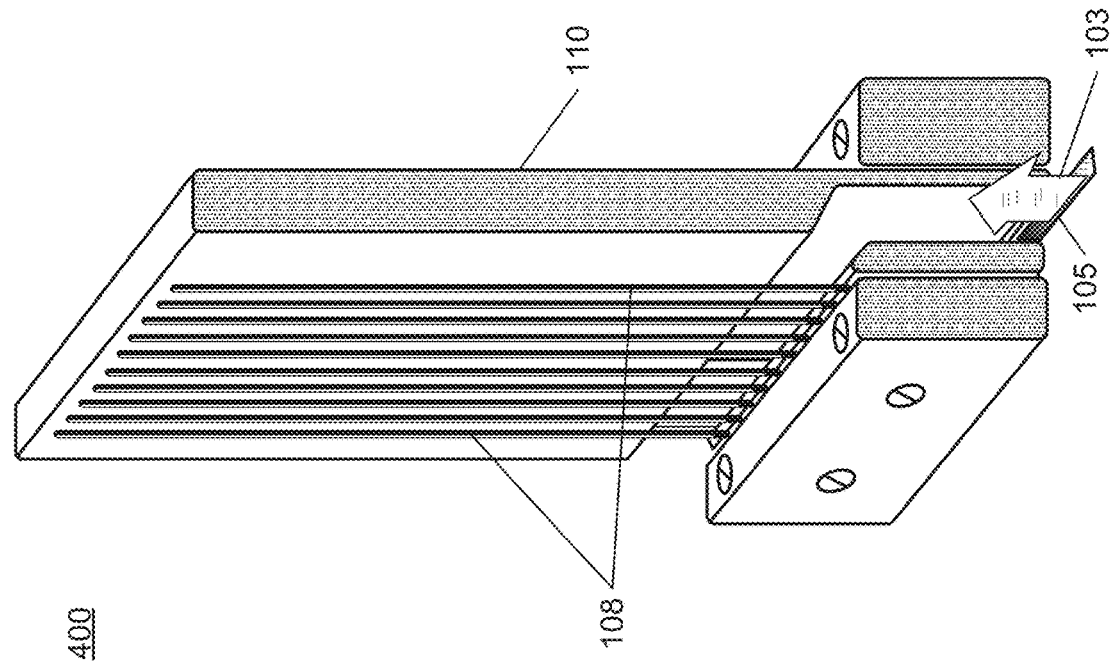
FIGS. 4A-4B are schematic diagrams illustrating yet another example electrode configuration for manufacturing nanomaterials, consistent with disclosed embodiments.
Figure 4A:
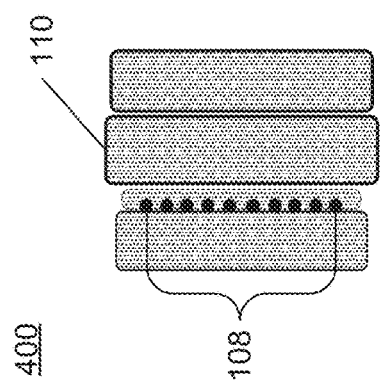

In some embodiments, high-voltage electrode 108 may include multiple elongate members. FIGS. 4A-4B are schematic diagrams illustrating an example electrode configuration 400 for manufacturing nanomaterials, consistent with the disclosed embodiments. As shown in FIGS. 4A-4B, electrode configuration 400 may be similar to electrode configuration 300 except that high-voltage electrode 108 includes more than two elongate members (e.g., ten rods, fewer than 10 rods, or more than 10 rods). Electrode configuration 400 may be used to scale up the capacity of nanoparticle generation because each free end of the elongate members of high-voltage electrode 108 may discharge high-voltage electric pulses 112 to grounding electrode 110. FIG. 4A is a top view of electrode configuration 400, and FIG. 4B is a perspective view of electrode configuration 400.

Figure 5A:
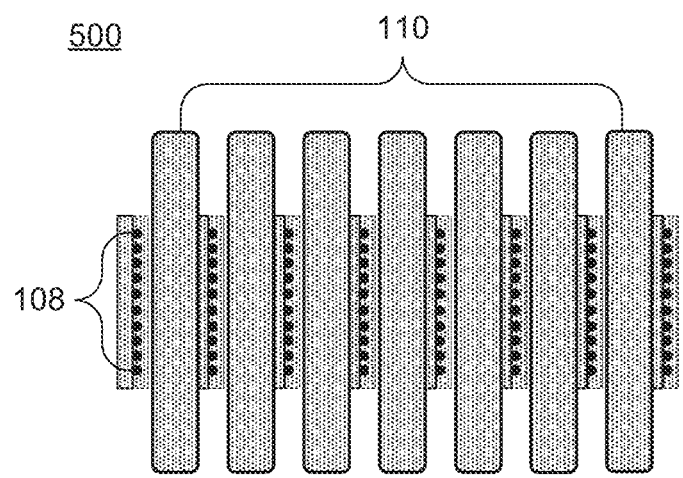
FIGS. 5A-5B are schematic diagrams illustrating yet another example electrode configuration for manufacturing nanomaterials, consistent with disclosed embodiments.
Figure 5B:
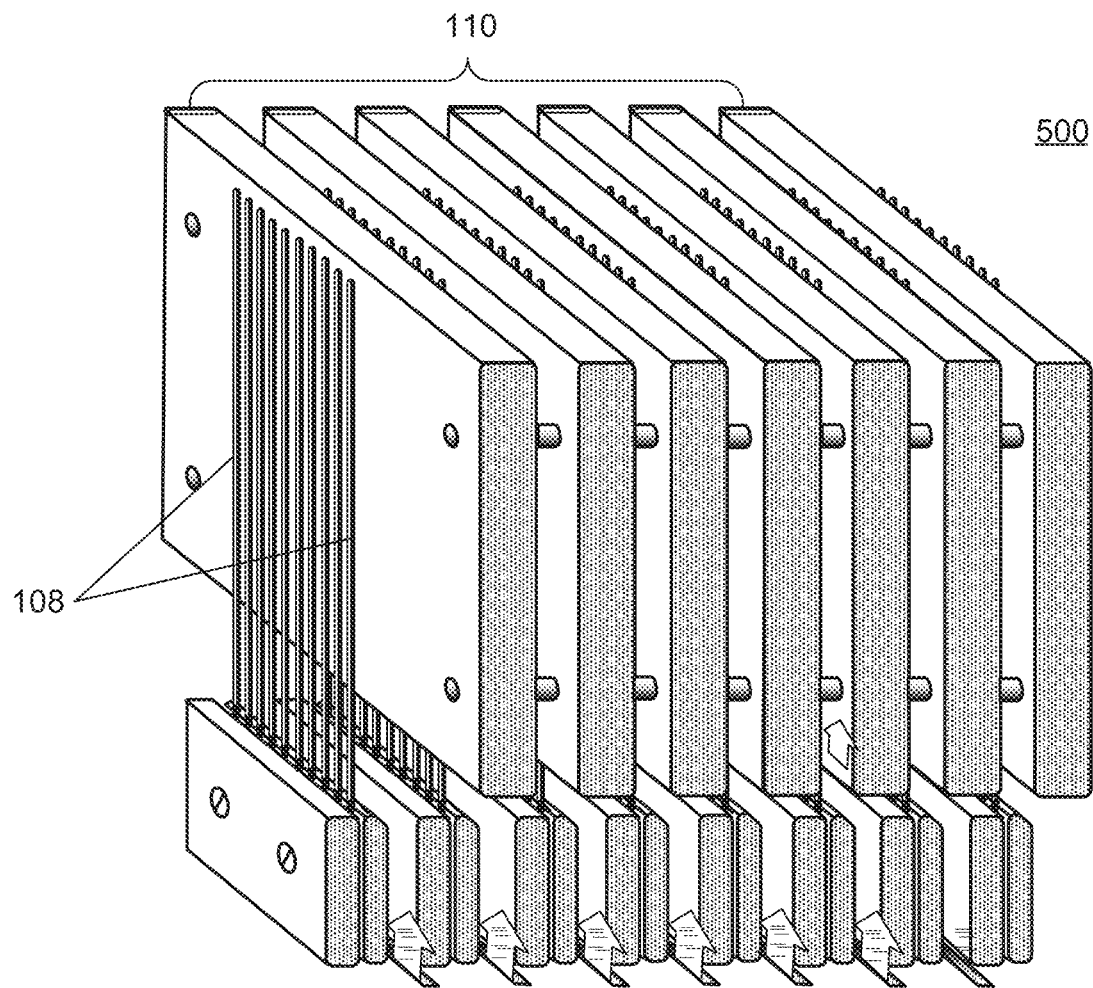

In some embodiments, high-voltage electrode 108 and grounding electrode 110 may each include a multi-layer structure. FIGS. 5A-5B are schematic diagrams illustrating an example electrode configuration 500 for manufacturing nanomaterials, consistent with the disclosed embodiments. As shown in FIGS. 5A-5B, electrode configuration 500 may include multiple layers of electrodes, each of which may be similar to electrode configuration 400 (e.g., each layer of high-voltage electrode 108 may include more than two elongate members). Electrode configuration 500 may be used to further scale up the capacity of nanoparticle generation. FIG. 5A may be a top view of electrode configuration 500, and FIG. 5B may be a perspective view of electrode configuration 500.

Figure 6A:
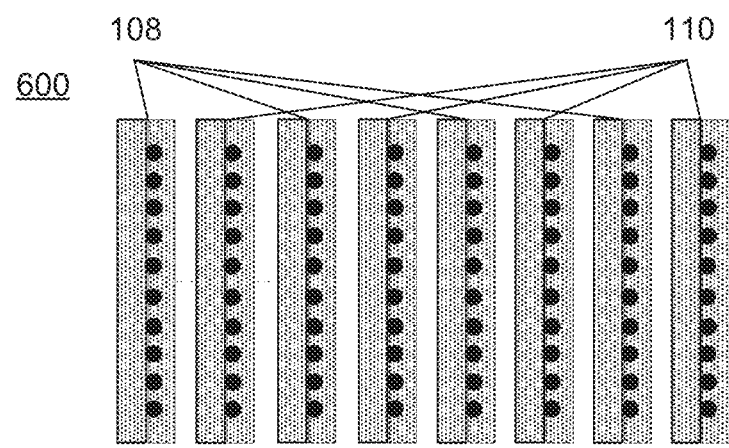
FIGS. 6A-6B are schematic diagrams illustrating yet another example electrode configuration for manufacturing nanomaterials, consistent with disclosed embodiments.
Figure 6B:
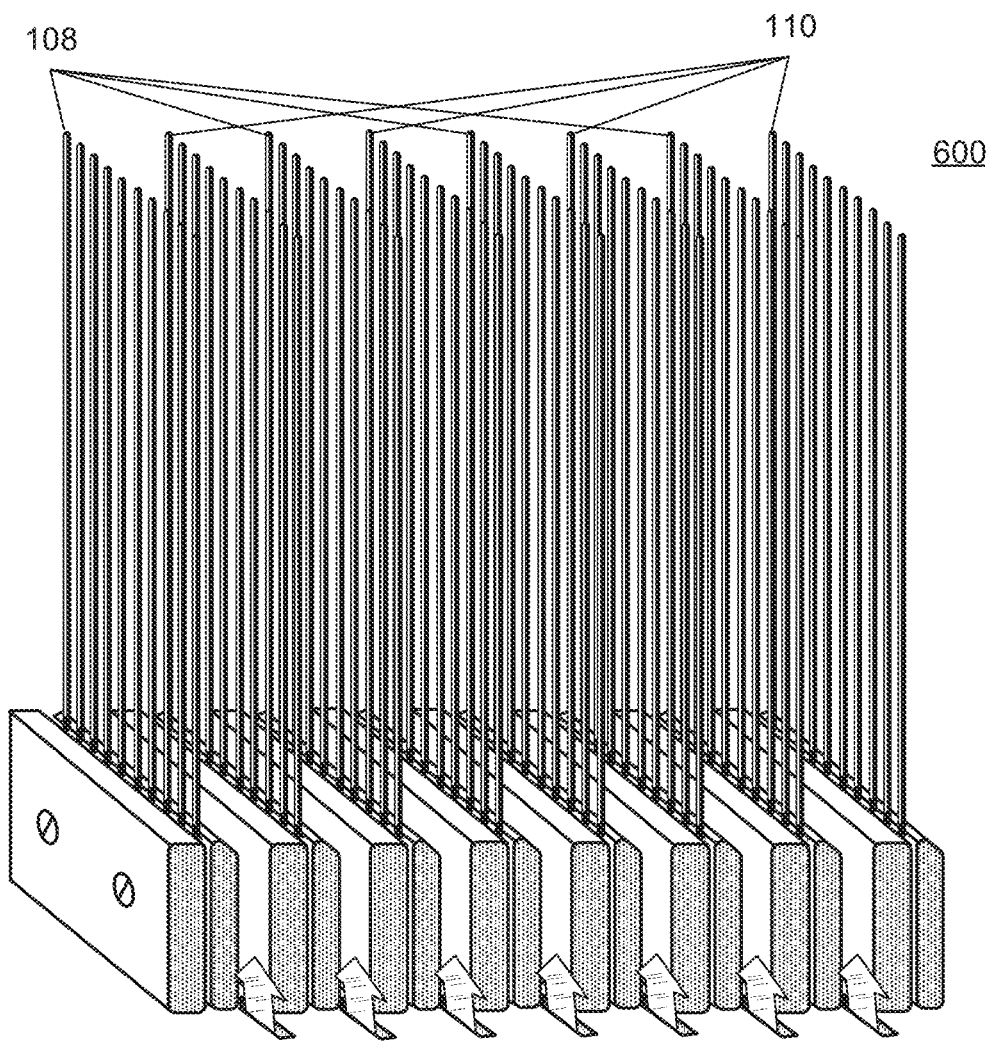

In some embodiments, both high-voltage electrode 108 and grounding electrode 110 may include elongate members (i.e., electrodes not including flat members). FIGS. 6A-6B are schematic diagrams illustrating an example electrode configuration 600 for manufacturing nanomaterials, consistent with disclosed embodiments. As shown in FIGS. 6A-6B, electrode configuration 600 may include multiple layers of electrodes (e.g., multiple layers of high-voltage electrode 108 and grounding electrode 110 arranged in an alternate order), each of which may include only elongate members (e.g., parallel rods). Electrode configuration 600 may be used to boost dielectric breakdown between layers to increase the frequency of repeating the pulse discharging, and thus to increase the capacity of nanoparticle generation. FIG. 6A is a top view of electrode configuration 600, and FIG. 6B is a perspective view of electrode configuration 600.

Figure 7:
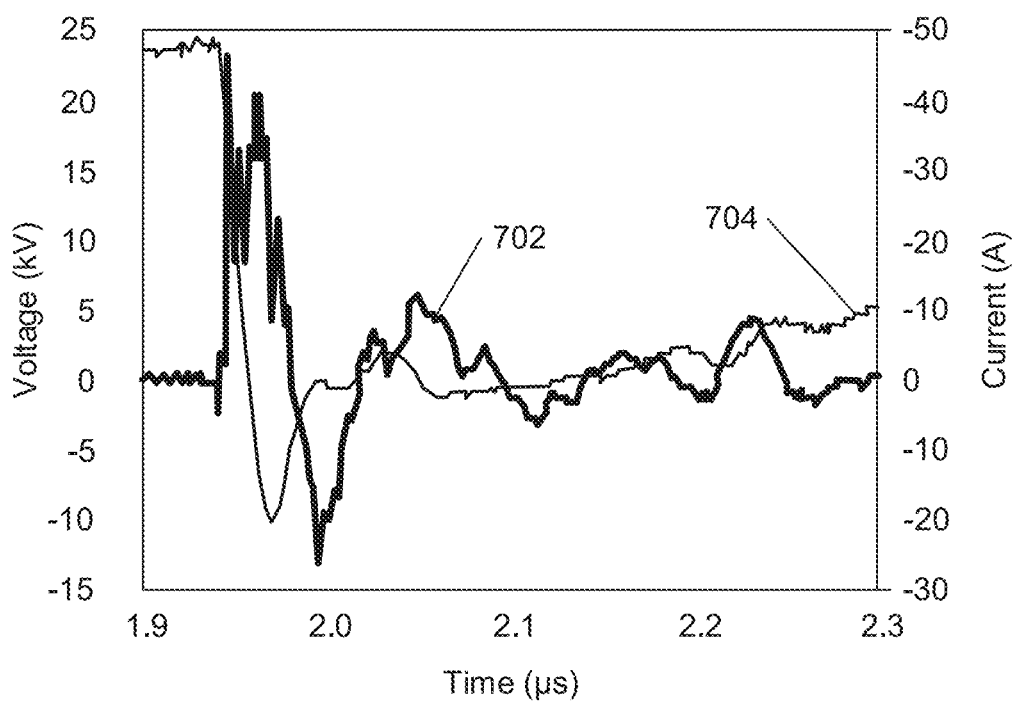
FIG. 7 is a schematic diagram illustrating example waveforms of a pulse current and a pulse voltage of a power supply, consistent with disclosed embodiments.

FIG. 7 is a diagram illustrating example waveforms of a pulse current and a pulse voltage of power supply 106, consistent with the disclosed embodiments. In FIG. 7, the example pulse current and voltage are represented by lines 702 and 704, respectively. The pulse current of FIG. 7 may include an actual discharge current (e.g., through the gap of high-voltage electrode 108 and grounding electrode 110) and a capacitive current that charges an electric capacitance between electrodes (e.g., high-voltage electrode 108 and grounding electrode 110). For example, the actual discharge current may be determined as a difference between a measured pulse current (e.g., from high-voltage electric pulses 112) and the capacitive current.

Figure 8:
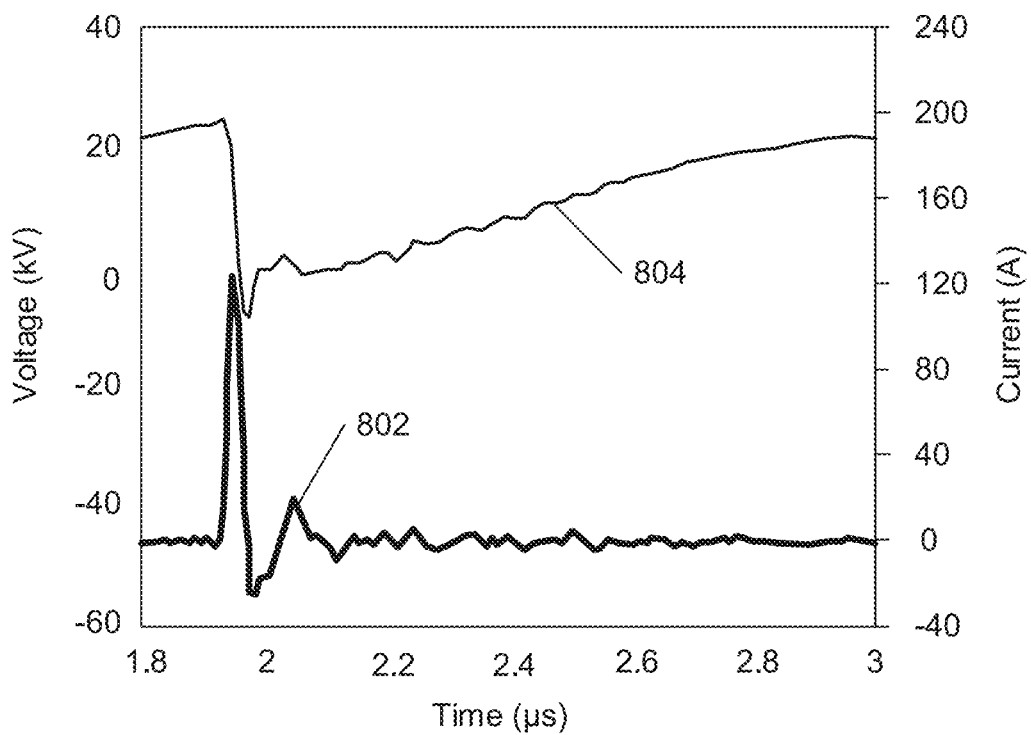
FIG. 8 is a schematic diagram illustrating example waveforms of an actual discharge current and an actual discharge voltage discharged to a working liquid, consistent with disclosed embodiments.

FIG. 8 is a schematic diagram illustrating example waveforms of an actual discharge current and an actual discharge voltage discharged to working liquid 103, consistent with the disclosed embodiments. In FIG. 8, the example actual discharge current and voltage are represented by lines 802 and 804, respectively. As shown in FIG. 8, a time duration (e.g., 20 nanoseconds or "ns") of creating a plasma channel (e.g., dielectric breakdown) in liquid is about one fifth of a time duration (e.g., 100 ns) of extinguishing the plasma channel and destruction of the bubbles.

Figure 9:
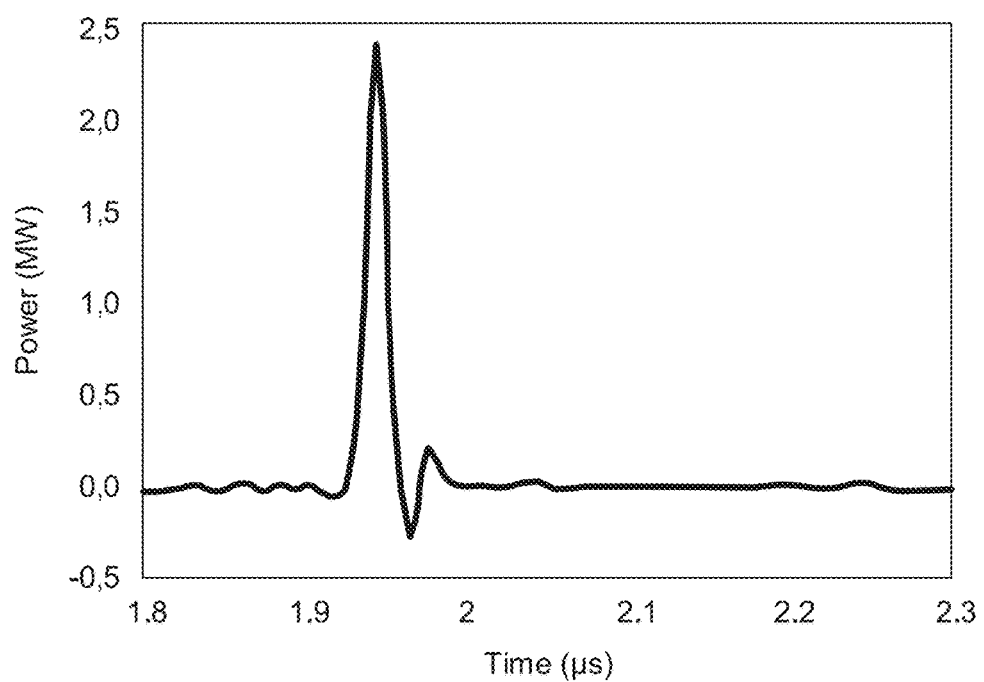
FIG. 9 is a schematic diagram illustrating an example waveform of a discharge power of a plasma pulse discharged to a working liquid, consistent with disclosed embodiments.

FIG. 9 is a schematic diagram illustrating an example waveform of a discharge power of high-voltage electric pulses 112 discharged to working liquid 103, consistent with the disclosed embodiments. As shown in FIG. 9, the peak of the discharge power may be high. In some cases, such a high discharge power may cause shockwaves (e.g., in the form of gas bubbles) to form in working liquid 103.

Figure 10:
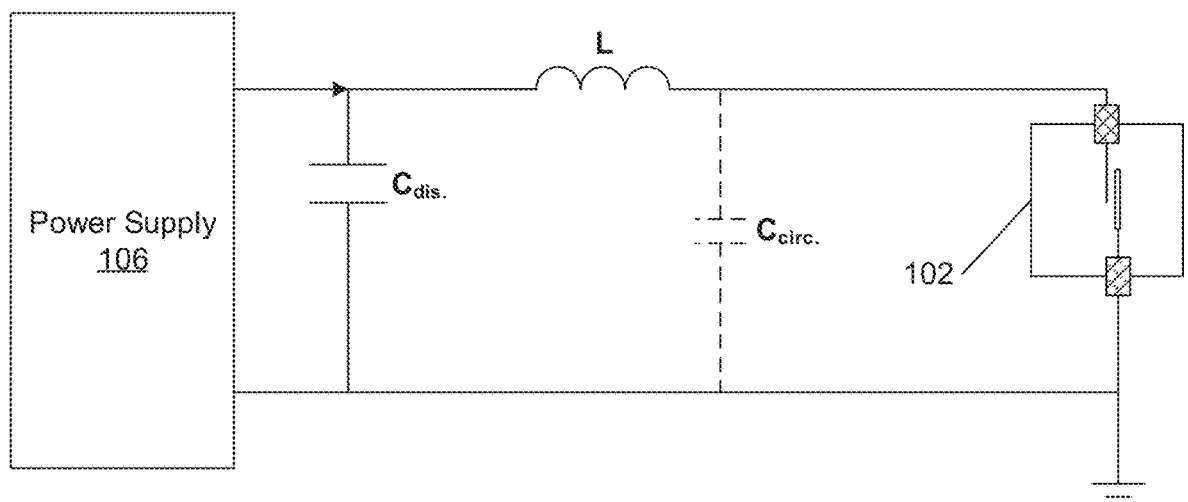
FIG. 10 is a schematic diagram illustrating an example circuit for manufacturing a nanomaterial, consistent with disclosed embodiments.

FIG. 10 is a schematic diagram illustrating an example circuit 1000 for manufacturing a nanomaterial, consistent with the disclosed embodiments. For example, the nanomaterial may include nanoparticles of a nanometer-scale size (e.g., 0.5 to 3 nm). FIG. 10 includes power supply 106, reactor chamber 102, a discharge pulse capacitor $C_{dis.}$, an inductor L, and a capacitance $C_{circ.}$ that represents self-capacitance of wires of circuit 1000. In some embodiments, $C_{circ.}$ may be adjusted, such as by installing an additional capacitor (or variable capacitor) parallel to $C_{dis}$. As shown in FIG. 10, when power supply 106 charges $C_{dis.}$, it also charges the inductor L. After some time (typically short), the voltage of $C_{dis.}$ may be sufficiently high to cause electric breakdown of $C_{circ.}$. $C_{circ.}$ may start to discharge through a plasma channel, resulting in a drop of its voltage, and one or more gas bubbles may expand (e.g., around second end 204 as shown in FIG. 2A) as a shockwave. The discharging of $C_{circ.}$ and the expansion of the gas bubbles may be accomplished in an ultrashort process (e.g., between 1 ns to 50 ns).

When the voltage of $C_{circ.}$ drops to substantially zero, the power input of power supply 106 to $C_{dis.}$ may also drop to substantial zero because $C_{dis.}$ is separated from $C_{circ.}$ by the inductor L. At this moment, the gas bubbles may be destroyed due to instability, and the discharging of $C_{circ.}$ may cease (i.e., $C_{circ.}$ may become open again). After the discharging of $C_{circ.}$ ceases, the voltage of $C_{circ.}$ may start to rise again (e.g., charged by $C_{dis.}$) until $C_{circ.}$ is sufficiently high again for a next electric breakdown event.

Figure 11:
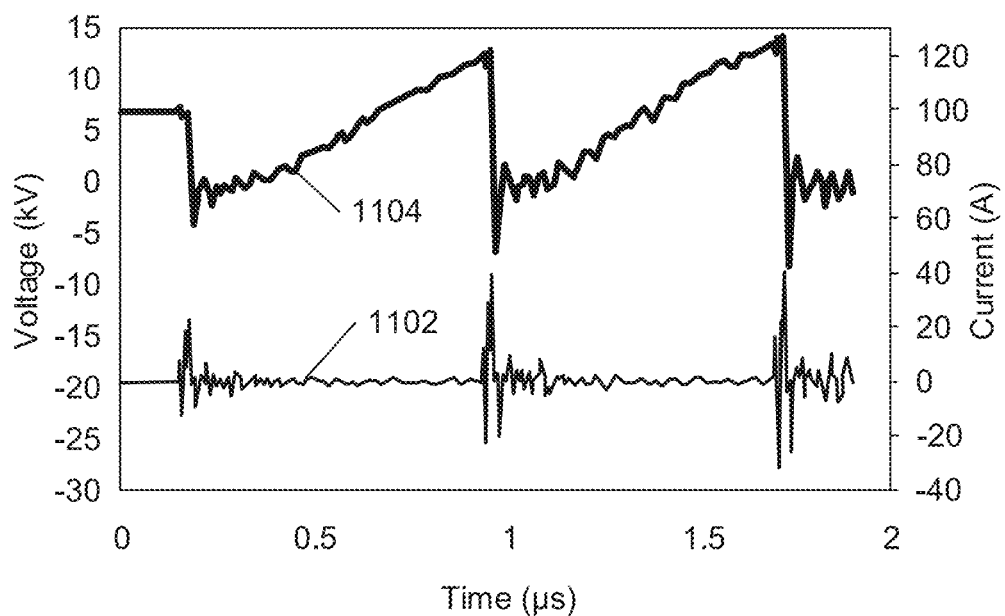
FIG. 11 is a schematic diagram illustrating example waveforms of serial pulses of a current and a voltage for manufacturing a nanomaterial, consistent with disclosed embodiments.

In some embodiments, the above process may be repeated at a high frequency (e.g., between 0.5 to 2 MHz), by which a series of high-voltage electric pulses 112 may be generated until the energy of $C_{dis.}$ is consumed. When the energy of $C_{dis.}$ is consumed, power supply 106 may begin charging $C_{dis.}$ again. Such a process may be possible when $C_{dis.}$ has the same order of magnitude with $C_{circ.}$. FIG. 11 is a diagram illustrating example waveforms of serial pulses of a current and a voltage for manufacturing a nanomaterial, consistent with the disclosed embodiments. In FIG. 11, the example pulse current and voltage are represented by lines 1102 and 1104, respectively.

In some embodiments, when manufacturing nanomaterials, system 100 may be set up in accordance with one or more of FIGS. 2A-11. Reactor chamber 102 may be filled with working liquid 103 (e.g., under the influence of circulation pump 104). Parameters (e.g., output power and pulsing frequency, among others) of power supply 106 may be set for production. During production, a flow velocity of working liquid 103 and composition of gas bubbles generated may be monitored and controlled. After a treatment time following production, nanoparticle suspension 116 may be removed from system 100. Then, nanoparticle suspension 116 may be analyzed, used directly, or dried (e.g., by vaporizing working liquid 103 at a different temperature to create dry nanoparticle powder).

The dry nanoparticle powder generated in the manufacturing process may have low electric conductivity (e.g., $10^5$-$5 \times 10^7$ ohm·cm). The dominant chemical element of the generated nanoparticle is carbon (with small admixture of iron from electrodes). In some embodiments, the nanoparticle powder may be produced on a surface of silicon crystal, in which the nanoparticles may conglomerate to a hexagonal shape, as shown in FIG. 12.

Figure 12:
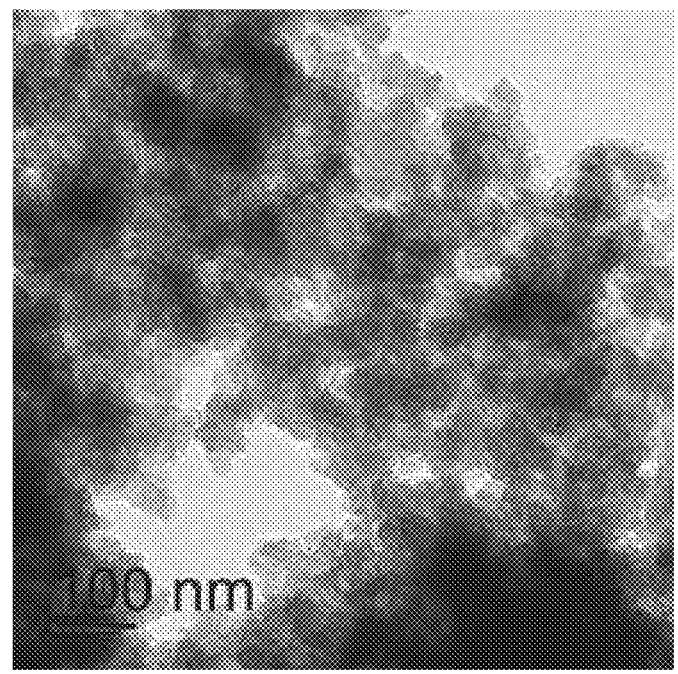
FIG. 12 is a transmission electron microscope (TEM) image illustrating structures of generated nanomaterials, consistent with disclosed embodiments.

FIG. 12 is a transmission electron microscope (TEM) image illustrating structures of generated nanomaterials, consistent with the disclosed embodiments. As shown in FIG. 12, the nanomaterials are uniform, and the conglomerated nanoparticles have a typical size of 10-20 nm. The actual size of individual nanoparticles may be significantly smaller.

Figure 13:
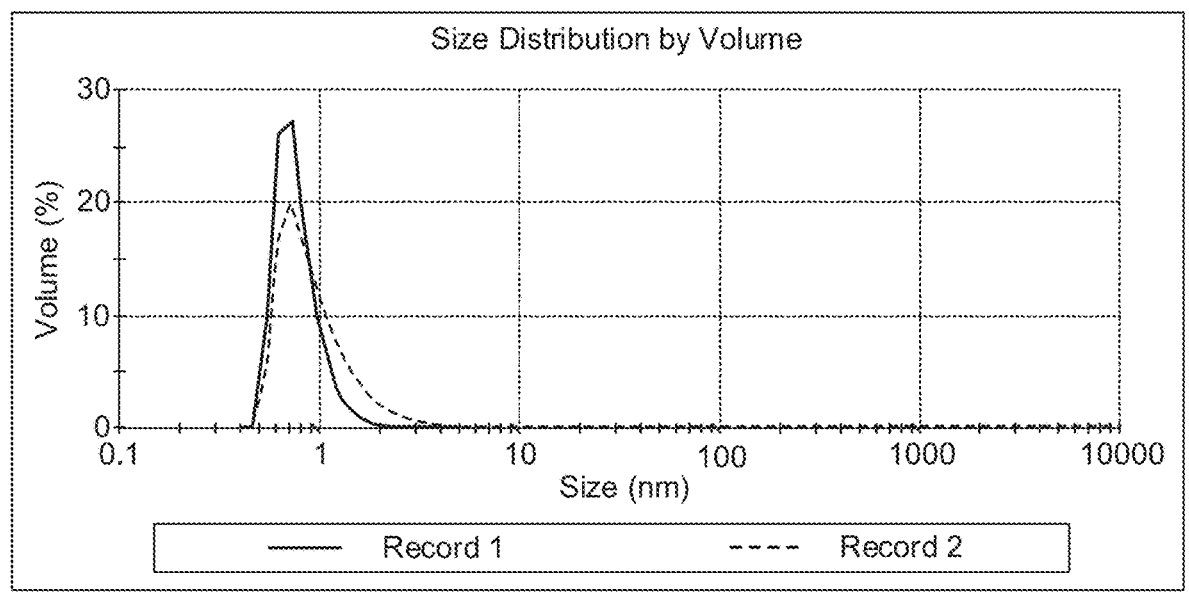
FIG. 13 is a graphical representation illustrating a distribution of sizes of nanoparticle dispersion determined by a dynamic light scattering (DLS) method, consistent with disclosed embodiments.
Figure 14:
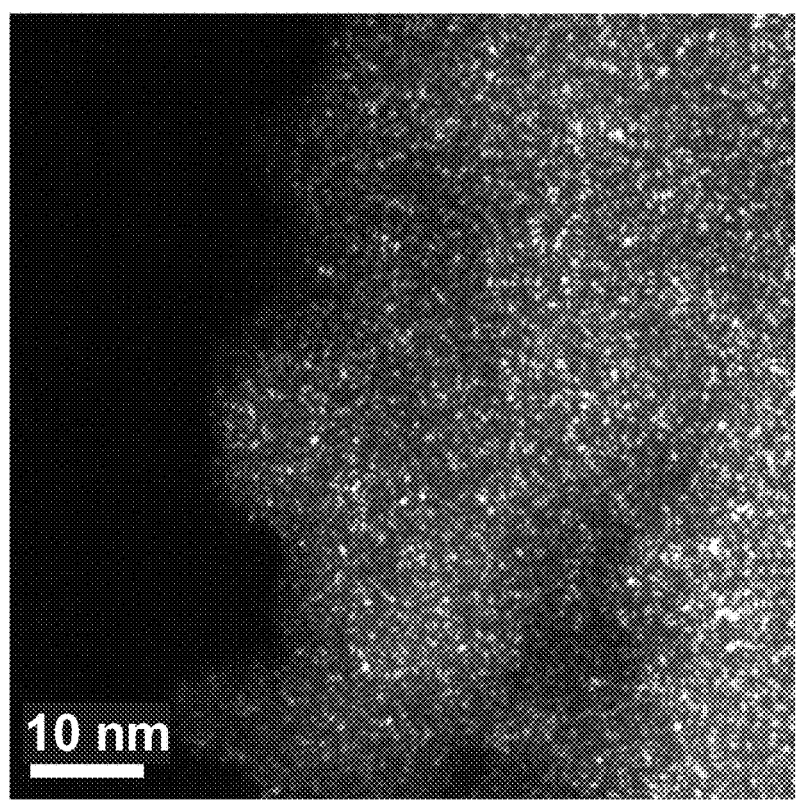
FIG. 14 is a dark field scanning transmission electron microscope (STEM) image illustrating sizes of dry nanoparticles, consistent with disclosed embodiments.

FIG. 13 is a graph representation illustrating a distribution of sizes of nanoparticle dispersion determined by a dynamic light scattering (DLS) method, consistent with disclosed embodiments. As shown in FIG. 13, most of the generated nanoparticles have a size about 1 nm. FIG. 14 is a dark field scanning transmission electron microscope (STEM) image illustrating sizes of dry nanoparticles, consistent with the disclosed embodiments. As shown in FIG. 14, the average dimension of the generated nanoparticles is about 1 nm (e.g., between about 0.5 nm and about 1.5 nm).

Figure 15:
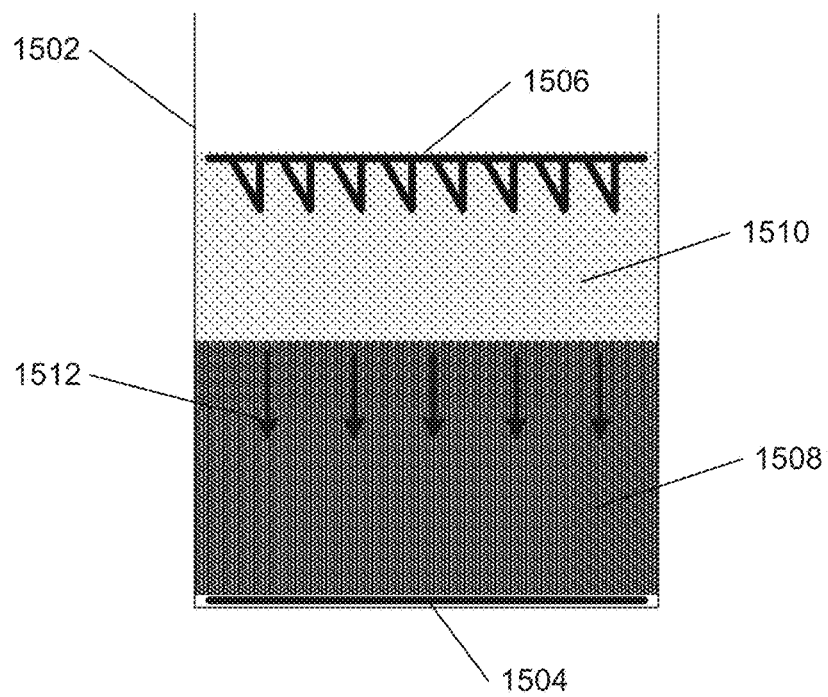
FIG. 15 is a schematic diagram illustrating an example setup for separating two types of dispersions, consistent with disclosed embodiments.

In the generated nanomaterials, two types of dispersions (e.g., suspensions that include fluid commingled with nanoparticles) may be obtained. The two types of dispersions may be formed by separating particles of a first type from particles of a second type to provide two different dispersions. As described, the structural differences in the two types of nanodiamond particles generated as a result of the disclosed plasma discharge techniques lead to the respective dispersions potentially having different properties (e.g., light transmission, viscosity, etc.). FIG. 15 is a schematic diagram illustrating an example setup for separating or generating two types of dispersions, consistent with disclosed embodiments. In FIG. 15, a mixed dispersion containing both types of nanodiamond particles may be poured into a vessel 1502 with a negative electrode 1504 having a flat bottom and a positive electrode 1506 having a "grater-type" top with sharp needles for providing a high electric field gradient. After applying a high voltage (e.g., 10 kV) between negative electrode 1504 and positive electrode 1506, a first type of nanodiamond particle (included in dispersion region 1510) may be uninfluenced by the high voltage. As a result, nanodiamond particles of the first type do not migrate in response to the applied voltage (or may migrate less than nanodiamond particles of the second type). In contrast, a second type nanodiamond particle (shown, for example, in dispersion region 1508 as a result of migration) may be influenced by the applied voltage and may start moving downward (e.g., away from positive electrode 1506), as indicated by the parallel black arrows 1512. As a result of the applied voltage, dispersion region 1510 may be left with a concentration of nanodiamond particles of the first type that is higher than a concentration of the nanodiamond particles of the second type. Similarly, dispersion region 1508 may be left with a concentration of nanodiamond particles of the second type that is higher than a concentration of the nanodiamond particles of the first type.

Such contrasting behaviors of the two types of dispersions 1508 and 1510 may be caused by their different electric dipole moment of particles in a solvent. For example, the first type of nanodiamond particles may have weak electric dipole moments, and the second type of nanodiamond particles may have stronger electric dipole moments. By applying an electric field (e.g., a high voltage between negative electrode 1504 and positive electrode 1506), for example, the two types of dispersions 1508 and 1510 may be separated because the particles with strong electric dipole moments may be attracted by one of the electrode (e.g., negative electrode 1504), and the particles with the weak electric dipole moments may be less affected by the electric field resulting from the applied voltage.

Figures 16A, 16B:
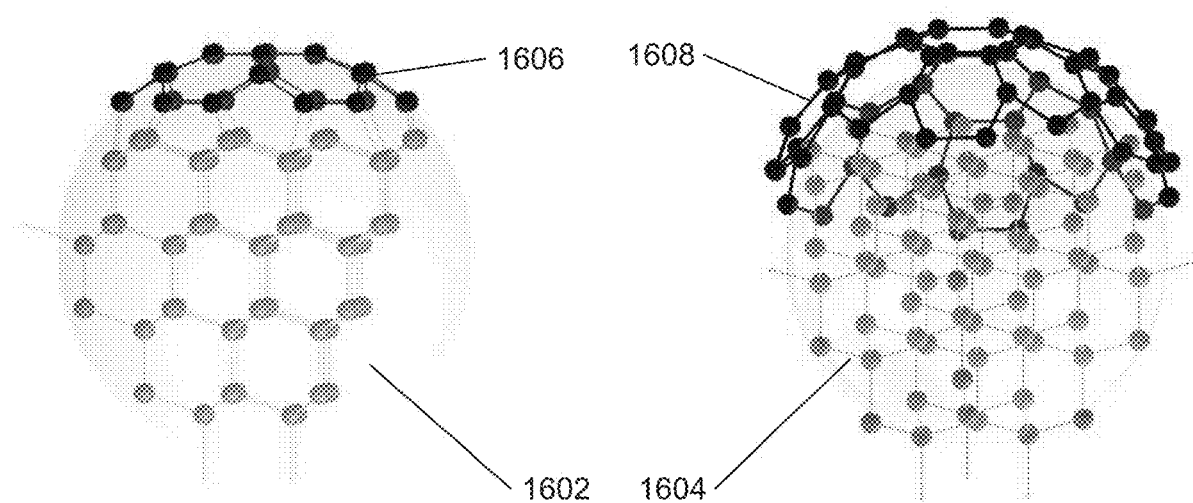
FIGS. 16A-16B are graphical representations illustrating surface structures of two types of dispersions represented by FIG. 15 and consistent with disclosed embodiments.

The different properties of both types of dispersions may be explained by the different molecular structure of the fabricated nanodiamond particles. For example, the nanodiamond particles fabricated using the disclosed systems and methods may include diamond cores capped by hybridized carbon atoms to form a graphene capon surfaces of the diamond cores. The graphene cap may include single-layer graphene, multi-layer graphene, or a mixture thereof. Each layer of the graphene cap may include one or more carbon atoms. FIGS. 16A-16B are graphical representations illustrating surface structures of the two types of nanodiamond particle types included in the two types of dispersions, consistent with disclosed embodiments. In FIGS. 16A-16B, the nanomaterials of each include a structure that has a nanodiamond core (core 1602 and 1604) with at least one graphene cap (graphene cap 1606 and 1608) on the core surface. The size of the graphene caps on the core surface may determine a size of a band gap, which may be about 3.4 to 4 eV for a core dimension of about 1 nm. The particles with a minimal band gap may correspond to an absorption drop wavelength for particles of the first type of dispersion in xylene.

Figure 16C:
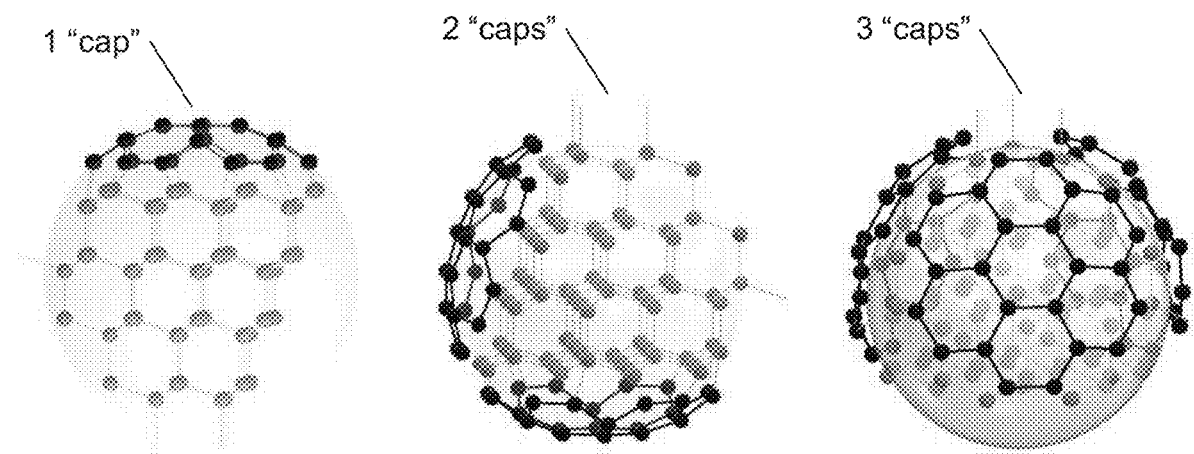
FIGS. 16C-16D are graphical representations illustrating location symmetries of graphene caps on nanodiamond cores, consistent with disclosed embodiments.
Figure 16D:
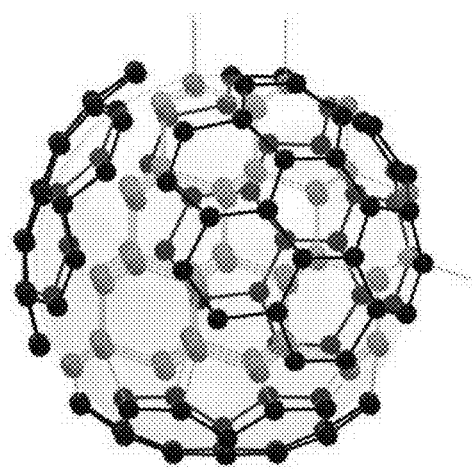

The location symmetry of the graphene caps may account for the dipole features (e.g., dipole moments) of the nanoparticles. A nanodiamond particle of the first type may have at least one graphene cap symmetrically located on the surface of its diamond core. For purposes of this disclosure, the first type of nanoparticle/nanodiamond may also be referred to as "symmetrically-capped particles," "symmetrically-capped nanodiamond particles," or "symmetrically-capped nanoparticles." A nanodiamond particle of the second type of dispersion may have at least one graphene cap asymmetrically located on the surface of its diamond core. For purposes of this disclosure, the second type of nanoparticles may also be referred to as "asymmetrically-capped particles," "asymmetrically-capped nanodiamond particles," or "asymmetrically-capped nanoparticles." FIGS. 16C-16D are diagrammatic representations illustrating location symmetries of graphene caps on nanodiamond cores, consistent with disclosed embodiments. FIG. 16C shows asymmetrical locations of graphene caps on 1-nm nanodiamond cores. From left to right, FIG. 16C shows a core having one cap, two caps, and three caps, all asymmetrical. The particles in FIG. 16C may be asymmetrically-capped particles that may form or may be more heavily associated with the second type of dispersion. For example, the second type of dispersion may have a higher concentration of asymmetrically-capped particles than symmetrically-capped particles. FIG. 16D shows symmetrical locations of four graphene caps on one 1-nm nanodiamond core. The particles in FIG. 16D may be the symmetrically-capped particles that may form or be more heavily associated with the first type of dispersion. For example, the first type of dispersion may have a higher concentration of symmetrically-capped particles than asymmetrically-capped particles.

On a macroscale, the first type of dispersion including a dispersion of the symmetrically-capped particles may remain non-aggregated and may move in working liquid 103 separately and individually. In some embodiments, the first type of dispersion may be transparent to visible light and may be stable. The second type of dispersion may include asymmetrically-capped particles (at least in a higher concentration than in the first type of dispersion). The asymmetrically-capped particles, when dispersed in a working fluid, may combine to form dynamic structures. Further, as noted, these nanodiamond particles may include a graphene cap asymmetrically covering a diamond core. In some embodiments, the second type of dispersion may be black in color at concentrations of the second nanodiamond particles types above 0.01%.

Figure 16E:
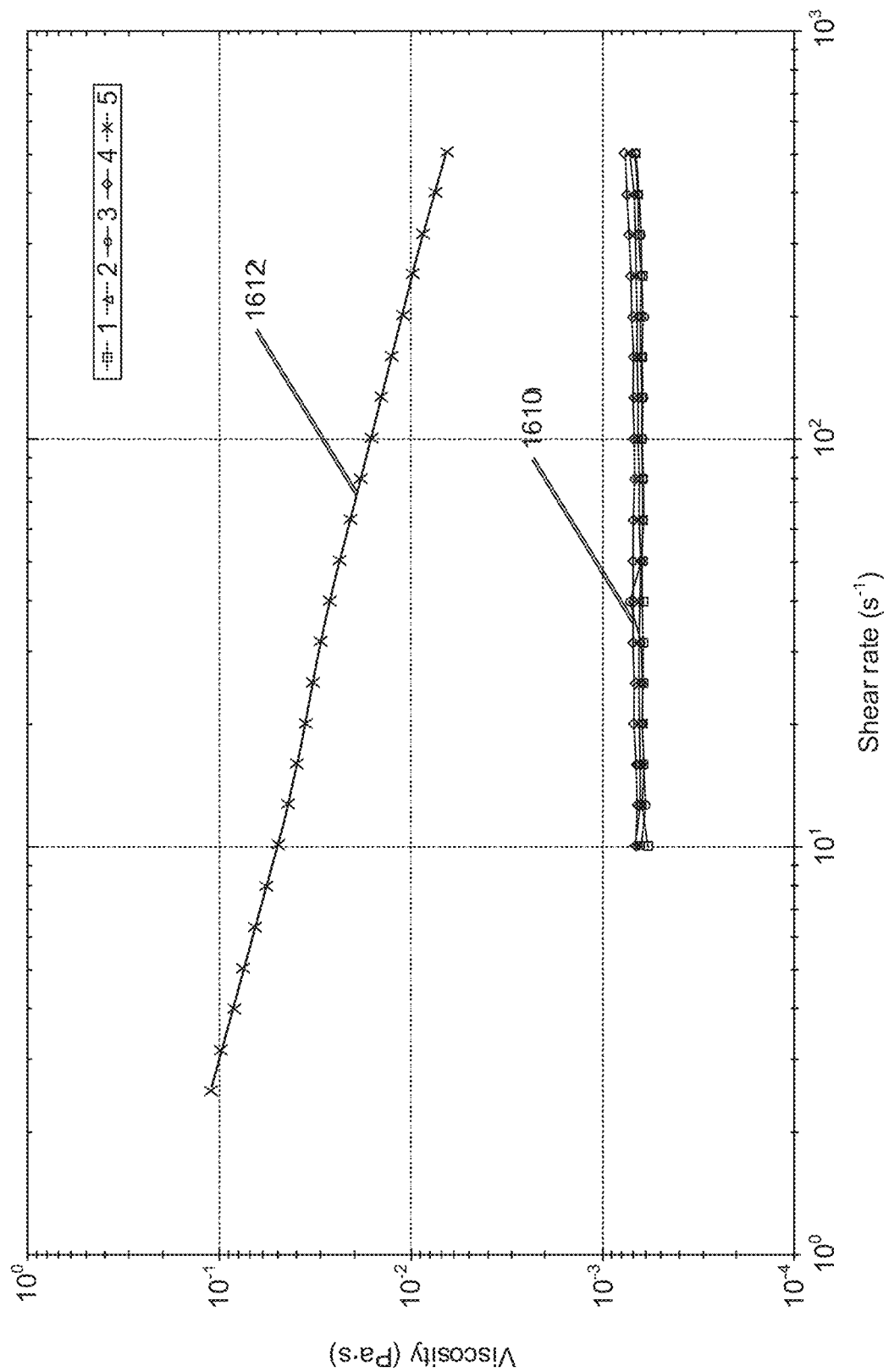
FIG. 16E is a graphical representation plotting exemplary viscosities versus shear rates for two types of liquid dispersions including nanoparticles fabricated using the disclosed embodiments.

The two types of dispersions may also differ with respect to other properties. For example, changing concentrations of the asymmetrically-capped particles may alter the viscosity of a corresponding dispersion. FIG. 16E is a graphical representation plotting exemplary viscosities versus shear rates for two types of liquid dispersions including nanoparticles fabricated using the disclosed embodiments. In FIG. 16E, the vertical axis represents the viscosity (with units of pascal-second or Pa·s), and the horizontal axis represents the shear rate (e.g., a rate at which one layer of fluid passes over an adjacent layer, with unit of $s^{-1}$). In FIG. 16E, the first type of dispersion 1610 has a concentration of the symmetrically-capped particles in a range of about 0.003-1%, and the second type of dispersion 1612 has a concentration of the asymmetrically-capped particles of about 1%. As shown in FIG. 16E, the two types of dispersions may exhibit different viscosity characteristics. For example, in FIG. 16E, the first type of dispersion 1610 may have a viscosity that remains virtually constant as shear rate changes. Notably, the viscosity of dispersion 1610 may also remain virtually unchanged even where the concentration of the nanoparticles changes (e.g., four lines are shown relative to dispersion 1610 are shown, each having a different concentration of nanoparticles selected from between 0.003-1%. On the other hand, the second type of dispersion 1612 may have a viscosity that varies with shear rate. For example, as shear rate is increased, the viscosity of the second type of dispersion 1612 decreases (e.g., from about 0.1 Pa·s to less than about 0.01 Pa·s for the shear rates tested). It should also be noted that changing the relative concentrations of the symmetrically-capped and asymmetrically-capped particles in the two types of dispersions may also affect the viscosities of the dispersions (and/or other properties as well). For example, by increasing the concentration of the asymmetrically-capped particles (those that have asymmetrical graphene caps) or increasing the concentration of the asymmetrically-capped particles relative to a concentration of the symmetrically-capped particles, for example, a viscosity of a corresponding dispersion (e.g., for a certain shear rate) may be increased.

In some embodiments, in the second type of dispersion, the ratio between SP2 hybridization (e.g., graphene caps) and SP3 hybridization (e.g., nanodiamond cores) may be studied using an X-ray photoelectron spectroscopy (XPS) technique. The XPS analysis indicates that the SP2:SP3 hybridization ratio may be close to 60%:40% for the first type of dispersion and 40%:60% for the second type of dispersion. Also, SP2:SP3 may also be influenced by the heating duration of the nanoparticle powder in hot hydrogen (e.g., 550° C.). The longer the treatment duration, the higher the ratio of SP3 hybridization may be. In accordance with the aforementioned characteristics of the nanoparticle dispersions, both types of dispersions may include crystalline nanomaterial (e.g., nanodiamond) core of a size about 1 nm with some amount of SP2 hybridized carbon atoms (e.g., "graphene caps") on its surface. Further, as can be seen from FIGS. 16C-16D, the SP2:SP3 ratio in symmetric and asymmetric nanoparticles may correspond to the observed SP2:SP3 ratio in nanoparticles of the first and second types of dispersions.

Figure 16G:
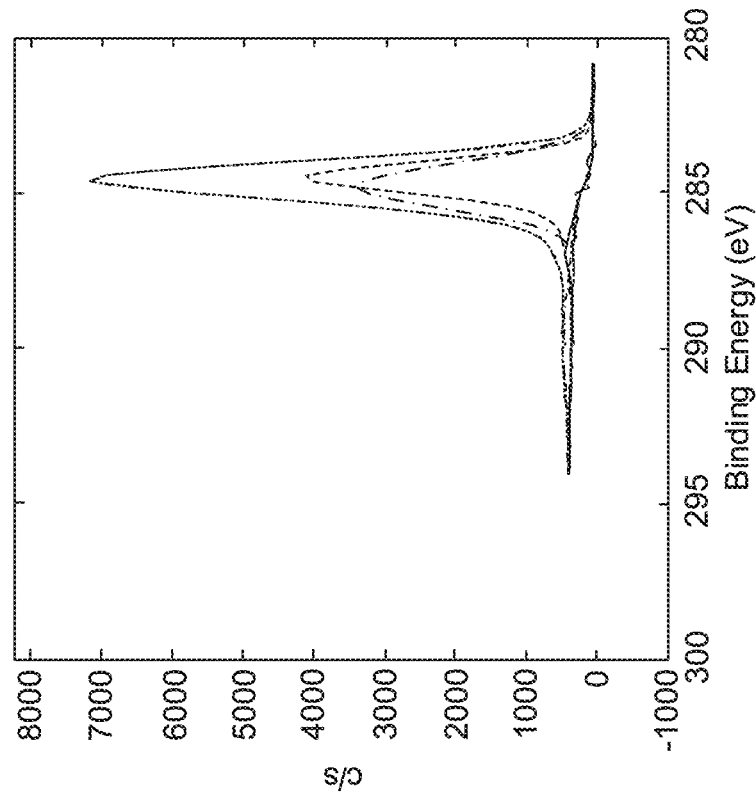
FIGS. 16F-16G show exemplary X-ray photoelectron spectroscopy (XPS) curves associated with the nanomaterials fabricated using the disclosed embodiments.
Figure 16F:
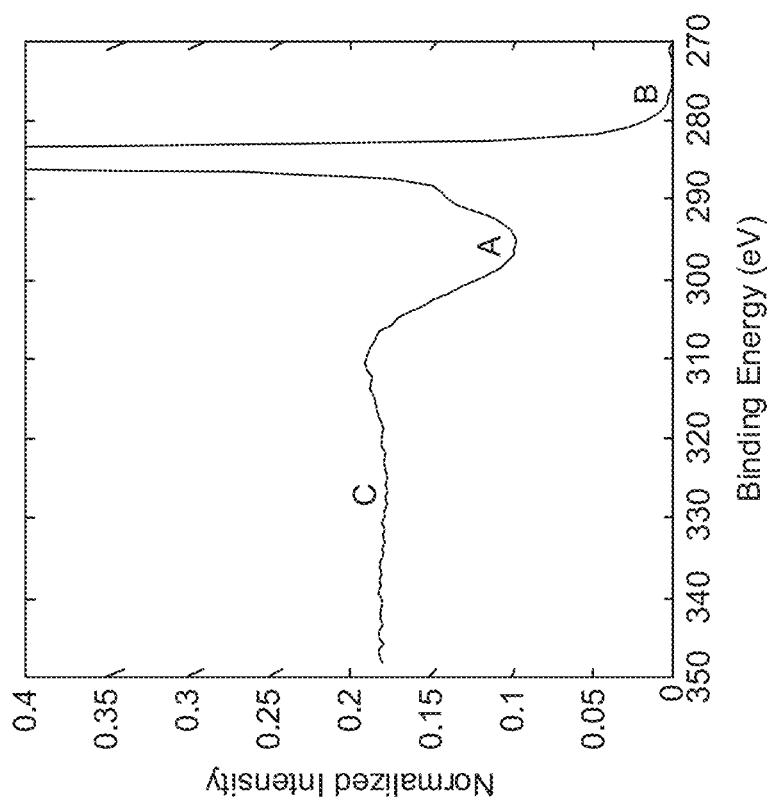

FIG. 16F is a graphical representation illustrating XPS spectra for carbon C1s with satellite spectrums for the second type of dispersion, consistent with the embodiments of this disclosure. FIG. 16G is a graphical representation illustrating an approximation of carbon C1s by SP2 and SP3 peaks for the second type of dispersion, consistent with the embodiments of this disclosure.

Besides different electric properties, the two types of dispersions may also have different optical properties. For example, the first type of dispersion in xylene may be studied by observing its luminescence ability under ultraviolet (UV) and visible light irradiation. The results indicate that the luminescence spectrum of the first type of dispersion may be independent of the excitation wavelength (e.g., up to 380 nm) and the liquid type (e.g., xylene, water, or the like). The results also indicate that the first type of dispersion may have a high absorption coefficient (e.g., greater than 1000 $cm^{-1}$) up to a wavelength of about 470 nm (see FIG. 16I). For example, the particles represented by FIG. 16A may exhibit a minimum band gap of about 4 eV that corresponds to an absorption drop wavelength of 400 nm. The particles represented by FIG. 16B may exhibit a minimum band gap of about 3.7 eV that corresponds to an absorption drop wavelength of 470 nm.

Figure 16H:
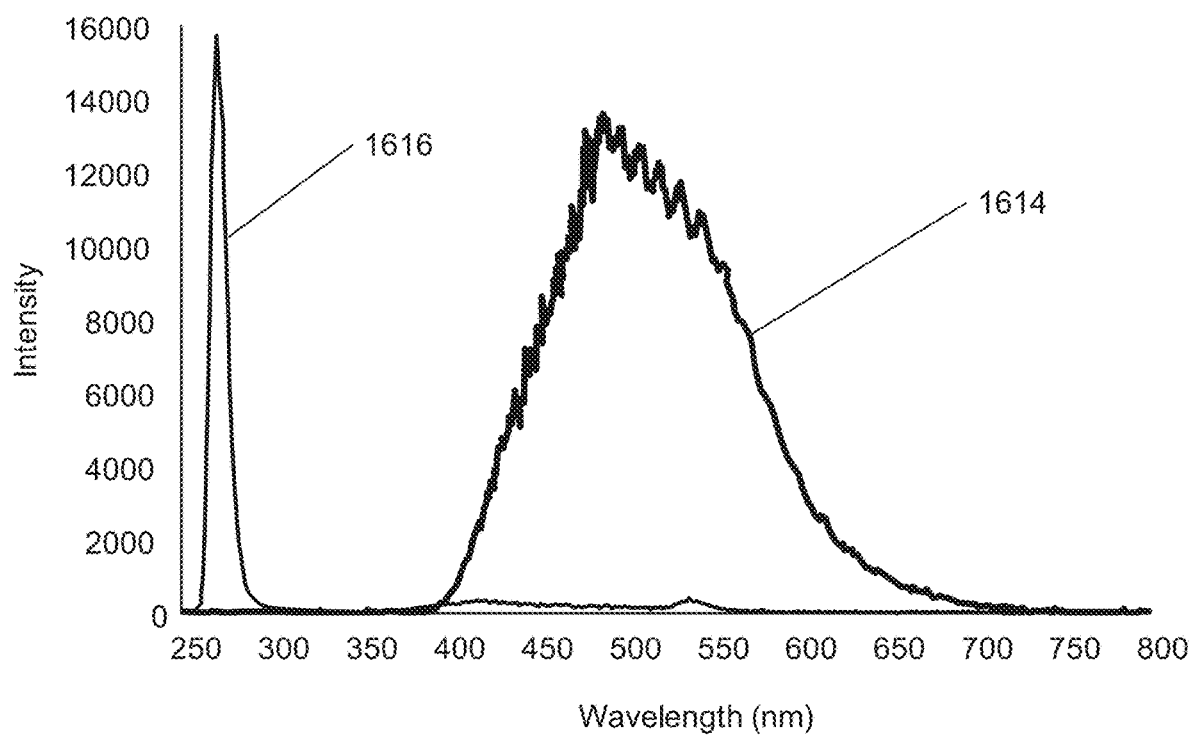
FIG. 16H is a graphical representation of a luminescence spectrum and an initial ultraviolet spectrum for a liquid dispersion including symmetrically-capped nanoparticles fabricated using the disclosed embodiments.
Figure 16I:
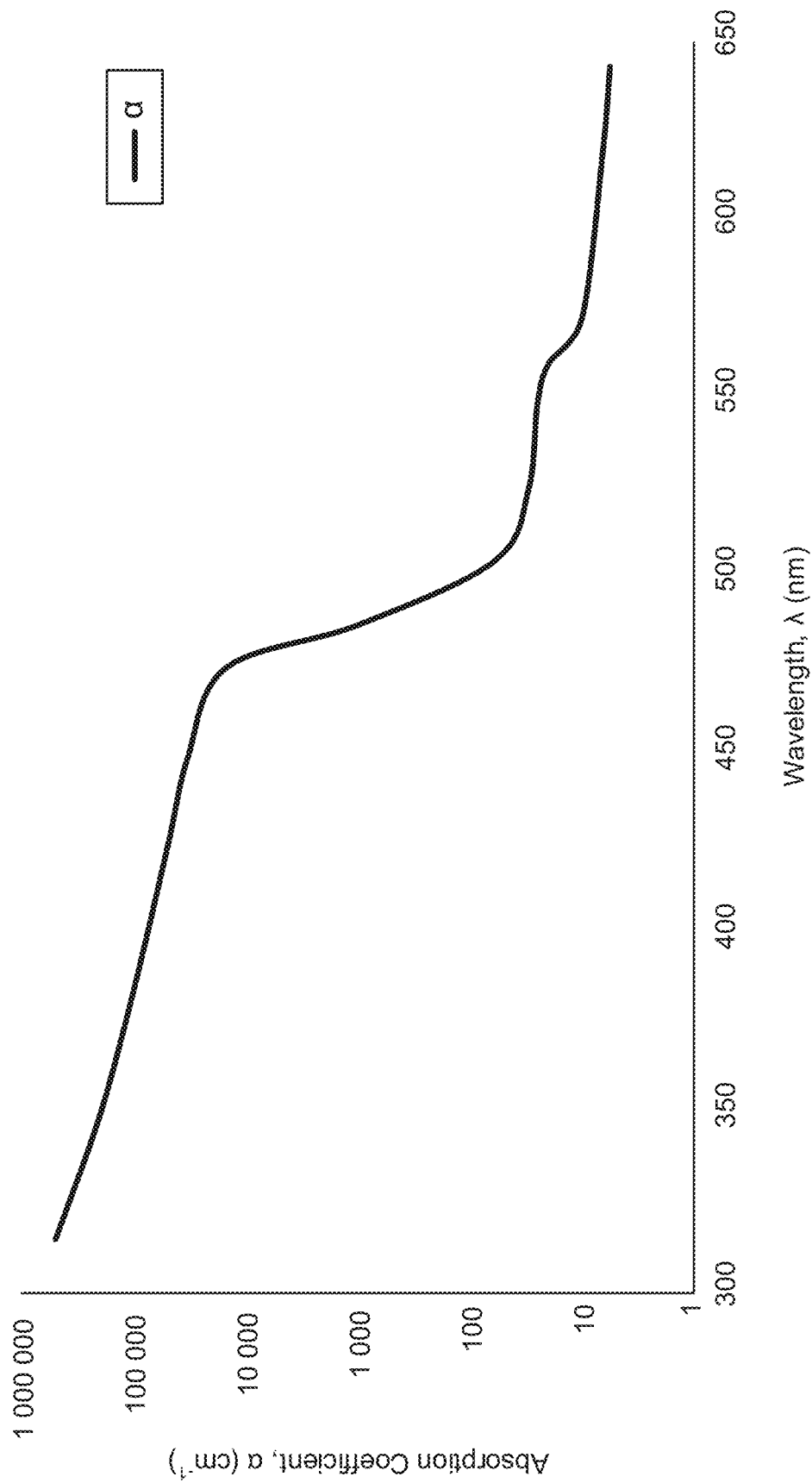
FIG. 16I is a graphical representation illustrating a relationship between absorption coefficients and wavelength of light for a liquid dispersion including symmetrically-capped nanoparticles fabricated using the disclosed embodiments.

FIG. 16H is a graphical representation illustrating a luminescence spectrum 1614 and an initial ultraviolet spectrum 1616 for the first type of dispersion, consistent with the embodiments of this disclosure. FIG. 16I is a graphical representation illustrating a relationship between absorption coefficients and wavelength of light for the first type of dispersion, consistent with the embodiments of this disclosure. As shown in FIG. 16I, around a wavelength of 470 nm, the first type of dispersion may have an absorption coefficient of around 1000.

Because of their different physical properties, both dispersions may be used for different purposes. For example, the first type of dispersion of nanoparticles may have little to no influence on liquid viscosity and thus may be used as additives to be homogenized with other substances (e.g., paints, plastics, protective coatings, electrolytes, or the like) to modify those substances and their properties. In another example, the second type of dispersion of nanoparticles may increase viscosity with a strong thixotropic effect and thus may be used for controlling liquid viscosity (e.g., for developing new lubricants, modifying properties of plastics, or the like).

Figure 17:
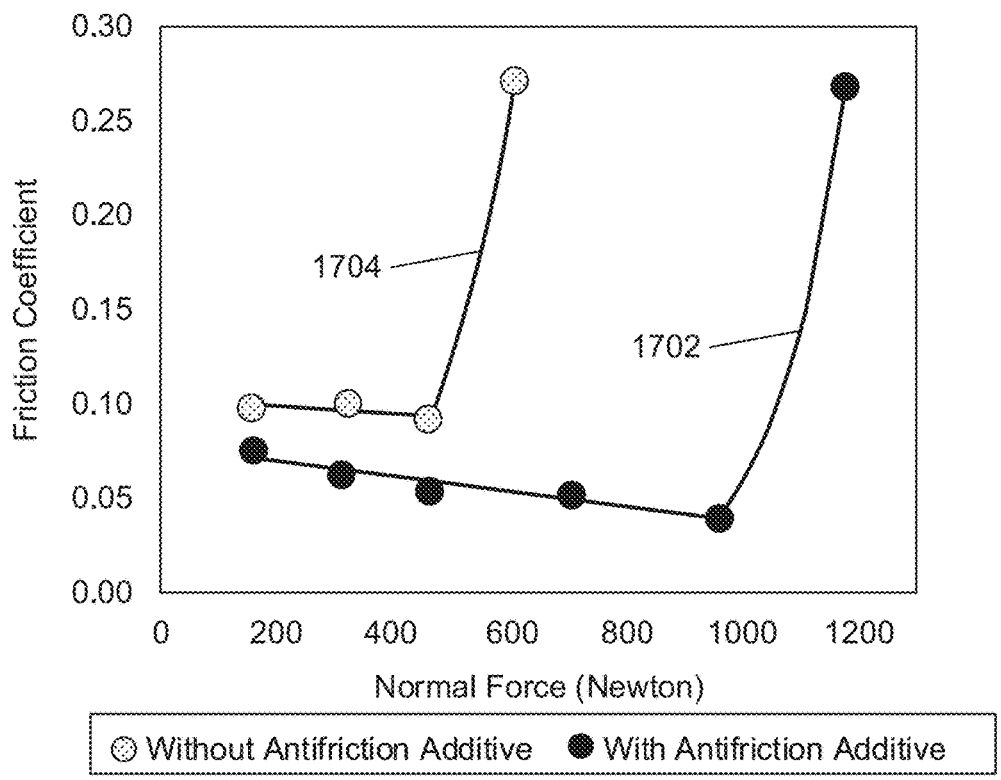
FIG. 17 is a graphical representation illustrating friction coefficients of lubricants with and without nanomaterial additives, consistent with disclosed embodiments.

In an embodiment, the generated nanomaterial suspension of the second type may be used as an antifriction additive for lubricants as a practical application. FIG. 17 is a graphical representation illustrating friction coefficients of lubricants with and without the addition of nanomaterial additives generated via disclosed embodiments. The lubricant with and without the antifriction additive are shown in lines 1702 and 1704, respectively. The friction coefficients of the lubricants are tested by pressing a rotating steel cone with a controlled force against a steel cylindrical hole under a cylinder rotation frequency of 900 $s^{-1}$. The modified lubricant is added with dry nanomaterial additive by 0.5%. As shown in FIG. 17, compared with the unmodified lubricant, the modified lubricant may decrease its friction coefficient even under greater pressing force, which indicates improvement after adding the nanomaterial additive.

Figure 18:
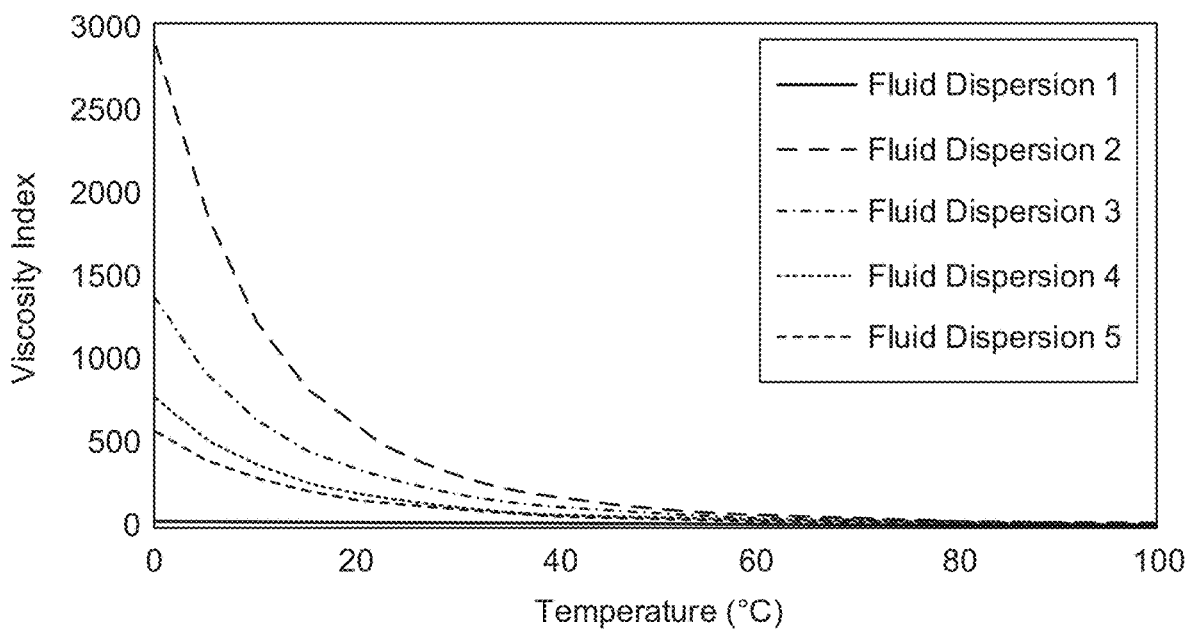
FIG. 18 is a graphical representation illustrating viscosity indices of a working liquid with different concentrations of nanomaterial additives, consistent with disclosed embodiments.

In another embodiment, the generated nanomaterial suspension of the second type may be used as an additive for low-viscosity silicone lubricant to increase its viscosity at high temperature. FIG. 18 is a graphical representation illustrating viscosity indices of a working liquid with different concentrations of nanomaterial additives, consistent with disclosed embodiments. For example, the working liquid may include xylene. In another example, the working liquid may include other types of fluids (e.g., lubricants), such as motor oil of Society of Automotive Engineers (SAE) standard (e.g., SAE 20W-50, SAE 15W-40, SAE 10W-30, SAE 5W-30, or the like). It should be noted that the working liquid may include other types of fluids/lubricants, not limited to the above examples. A viscosity index is a characteristic indicative of growth of a viscosity of a lubricant as temperatures drop. In some embodiments, the nanomaterial may be added to a lubricant (e.g., silicone lubricant) in suspension, in which the working liquid (e.g., xylene) may be evaporated and thus avoids a stage of producing dry powder. As shown in FIG. 18, five fluid dispersions (e.g., working liquid with five different concentrations of the nanomaterial additive) are represented. From fluid dispersion 1 to fluid dispersion 5, the concentration of the nanomaterial additive decreases, with fluid dispersion 1 having the most concentration of the nanomaterial additive, and fluid dispersion 5 having the least concentration of the nanomaterial additive. As shown in FIG. 18, fluid dispersion 1 shows stable viscosity index under a wide range of temperatures and a viscosity index of about 1000. As the concentration of the nanomaterial additive decreases, the viscosity index increases more as the temperatures drop. Fluid dispersion 1 may offer superior lubricant performance compared with fluid dispersions 2 to 5. In other words, addition of nanoparticles fabricated according to the presently disclosed embodiments (e.g., asymmetric nanodiamond particles), even in concentrations ranging from 0.001% to 3%, or more particularly in a range of 0.5% to 1.5%, may significantly enhance the viscosity properties of a working fluid.

Figure 19:
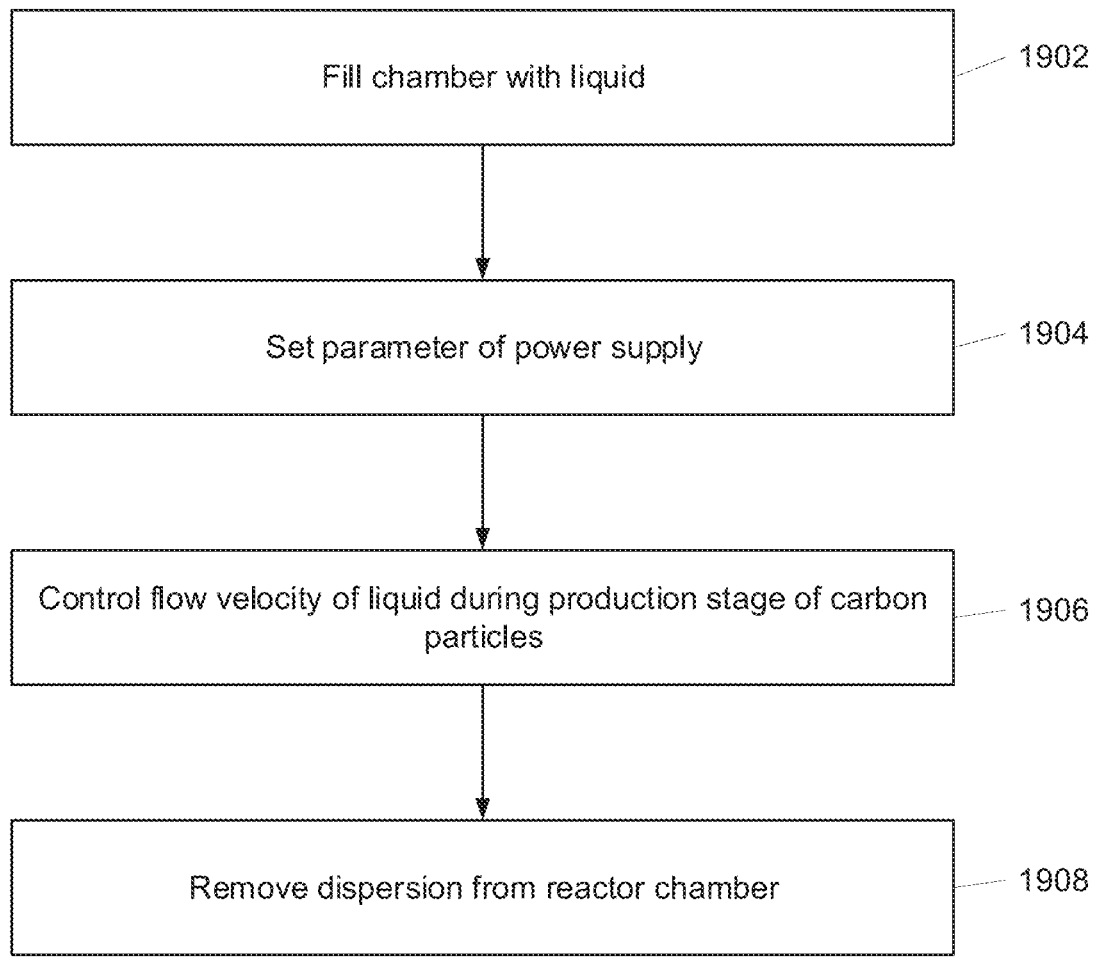
FIG. 19 is a flowchart of an example process of manufacturing a nanomaterial, consistent with embodiments of this disclosure.

FIG. 19 is a flowchart of an example process 1900 of manufacturing a nanomaterial, consistent with embodiments of this disclosure. Process 1900 includes steps 1902-1908. As examples, process 1900 may be implemented in connection with the systems as described in FIGS. 1-18. It should be noted that the manufacturing process may be implemented with various configurations and are not limited to the above examples.

At step 1902, a reactor chamber (e.g., reactor chamber 102) is filled with a liquid (e.g., working liquid 103). For example, as shown in FIG. 1, circulation pump 104 may pump working liquid from pure working liquid source 114 into reactor chamber 102 through inlet 105. The reactor chamber may enclose a first electrode (e.g., high-voltage electrode 108), a second electrode (e.g., grounding electrode 110), and the liquid. The first electrode and the second electrode may have a gap. In some embodiments, the gap is greater than or equal to 0.3 millimeters and smaller than or equal to 3 millimeters. The first electrode and the second electrode may be parallel. The first and second electrode may be electrically coupled to a power supply (e.g., power supply 106) such that a plasma pulse (e.g., high-voltage electric pulses 112) may be generated in the gap when the power supply provides a pulse electric output (e.g., voltage or current).

At step 1904, parameters of the power supply (e.g., power supply 106) may be set, adjusted, etc. For example, parameters of the power supply may be selected such that the discharge power of high-voltage electric pulses 112 may be at or above 1 MW, and a frequency of the pulse electric output is at or above 100 Hz. In some embodiments, a pulse duration of the high-voltage electric pulses 112 may be greater than or equal to 10 nanoseconds and smaller than or equal to 40 nanoseconds.

At step 1906, a flow velocity of the liquid is controlled during a production stage of carbon particles. The carbon particles may be generated by the plasma pulse between the gap in the liquid. For example, the flow velocity may be controlled by a pump (e.g., circulation pump 104). The flow velocity may be controlled at a value to optimize the production rate (e.g., to quickly remove gas bubbles 206 in FIG. 2D) of nanoparticles. In some embodiments, an average dimension (e.g., diameter) of the produced carbon particles may be one nanometer. In some embodiments, the carbon particles may include a diamond core capped by at least one graphene cap (e.g., as shown in FIGS. 16A-16D).

In some embodiments, the at least one graphene cap may be symmetrically located on the diamond core (e.g., as shown in FIG. 16D) of a first type of carbon particles (e.g., symmetrically-capped particles), in which the first type of carbon particles may be used as at least one of an additive to a solar panel for increasing efficiency, an additive to a luminescence marker for medical use, an additive to a luminophore for a quantum-dot display and a light source, or an additive to a paint, a coating, or a plastic for absorbing ultraviolet. In some embodiments, the at least one graphene cap may be asymmetrically located on the diamond core (e.g., as shown in FIGS. 16A-16C) of a second type of carbon particles (e.g., asymmetrically-capped particles). Either the first or the second type of carbon particles may be used as at least one of an antifriction additive to a lubricant, a wear-reduction agent to the lubricant, an antioxidating agent to the lubricant, or an additive for increasing thermal conductivity to the lubricant, a cooling liquid, or a polymer.

At step 1908, a dispersion that includes the carbon particles and the liquid (e.g., nanoparticle suspension 116) is removed from the reactor chamber (e.g., via outlet 107). In some embodiments, the production stage may run in a continuous mode, in which the dispersion may be continuously removed from the chamber. In some embodiments, the production stage may run in an intermittent mode, in which the dispersion may be removed from the chamber after a treatment time following the production stage. In some embodiments, the dispersion may include a first type of dispersion (e.g., mainly including the symmetrically-capped carbon particles) and a second type of dispersion (e.g., mainly including the asymmetrically-capped carbon particles), as previously described.

After step 1908, the dispersion may be analyzed, used, or further processed. For example, the dispersion that may be separated to be the first type of dispersion and the second type of dispersion.

In an embodiment, using system 100 as an example, reactor chamber 102 may be filled with a certain amount (e.g., 1 liter) of reagent grade working fluid 103 (e.g., o-xylene). Parameters of power supply 106 may be selected, such that the discharge power of high-voltage electric pulses 112 may reach 1.5 MW with an average pulse repetition frequency of 1000 Hz. During production, the flow velocity of the working liquid 103 and gas bubbles (e.g., bubbles 206 in FIG. 2D) generated by high-voltage electric pulses 112 may be controlled. After a treatment time following the production, nanoparticle suspension 116 that includes liquid and nanoparticles may be removed from system 100. Nanoparticle suspension 116 may be further separated into different types for analysis, usage, or further processing. In an example, using the above setup, after four hours of operation, the production process may yield 0.9 grams of 1-nm symmetrically-capped carbon nanoparticles and 1.2 grams of asymmetrically-capped carbon nanoparticles.

In another embodiment, using system 100 as an example, reactor chamber 102 may be filled with a certain amount (e.g., 1 liter) of a mixture of 90% reagent grade o-xylene and 10% of reagent grade of isopropanol. Parameters of power supply 106 may be selected, such that the discharge power of high-voltage electric pulses 112 may reach 1.5 MW with an average pulse repetition frequency of 1000 Hz. During production, the flow velocity of the working liquid 103 and composition of gas bubbles (e.g., bubbles 206 in FIG. 2D) generated by high-voltage electric pulses 112 may be controlled. After a treatment time following the production, nanoparticle suspension 116 that includes liquid and nanoparticles may be removed from system 100. In an example, using the above setup, after four hours of operation, the production process may yield 0.12 grams of 1-nm symmetrically-capped carbon nanoparticles and 0.15 grams of asymmetrically-capped carbon nanoparticles. Nanoparticle suspension 116 may be further separated to different types for analysis, usage, or further processing. In an example, nanoparticle suspension 116 may be separated to be the first and second types of dispersions, and further be analyzed by DLS, X-ray, XPS, or gravimetric techniques.

In yet another embodiment, using system 100 as an example, reactor chamber 102 may be filled with a certain amount (e.g., 1 liter) of a mixture of 90% reagent grade o-xylene and 10% of reagent grade hexane. Parameters of power supply 106 may be selected such that the discharge power of high-voltage electric pulses 112 may reach 1.5 MW with an average pulse repetition frequency of 1000 Hz. During production, the flow velocity of the working liquid 103 and composition of gas bubbles (e.g., bubbles 206 in FIG. 2D) generated by high-voltage electric pulses 112 may be controlled. After a treatment time following the production, nanoparticle suspension 116 that includes liquid and nanoparticles may be removed from system 100. In an example, using the above setup, after four hours of operation, the production process may yield 0.3 gram of 1-nm symmetrically-capped carbon nanoparticles and 0.25 gram of asymmetrically-capped carbon nanoparticles. Nanoparticle suspension 116 may be further separated to different types for analysis, usage, or further processing. In an example, nanoparticle suspension 116 may be separated to be the first and second types of dispersions, and further be analyzed by DLS, X-ray, XPS, or gravimetric techniques.

In yet another embodiment, using system 100 as an example, reactor chamber 102 may be filled with a certain amount (e.g., 1 liter) of technical grade xylene that includes a mixture of o-xylene, m-xylene, p-xylene, and ethylbenzene. Parameters of power supply 106 may be selected such that the discharge power of high-voltage electric pulses 112 may reach 1.5 MW with an average pulse repetition frequency of 1000 Hz. During production, the flow velocity of the working liquid 103 and composition of gas bubbles (e.g., bubbles 206 in FIG. 2D) generated by high-voltage electric pulses 112 may be controlled. After a treatment time following the production, nanoparticle suspension 116 that includes liquid and nanoparticles may be removed from system 100. In an example, using the above setup, after four hours of operation, the production process may yield 1.7 grams of 1-nm symmetrically-capped carbon nanoparticles and 0.3 grams of asymmetrically-capped carbon nanoparticles. Nanoparticle suspension 116 may be further separated to different types for analysis, usage, or further processing. In an example, nanoparticle suspension 116 may be separated to be the first and second types of dispersions, and further be analyzed by DLS, X-ray, XPS, or gravimetric techniques.

As can be seen from the above examples, the presence of substances including a benzene ring (e.g., aromatic substances) may be important for generating the 1-nm nanoparticles with diamond cores. Other organic substances with different ratios of hydrogen and carbon may decrease the formation of carbon nanoparticles. In some embodiments, the ratio between the first and second types of dispersions may be controlled by adjusting the content of the aromatic substances in the initial dielectric liquid.

As can be seen from the above descriptions, the embodiments of this disclosure provide systems and methods of manufacturing nanomaterials with low cost, effectiveness, and safety. For example, system 100 does not require any special explosion-proof facilities or equipment. Also, the produced nanomaterials may be uniformly intermixed with liquid. Further, the size of the produced nanoparticles may be in the 1-nm range (e.g., 0.5 nm to 3 nm), compared with the 5-nm size provided by existing technologies. Moreover, the disclosed systems and methods may facilitate the scaling of production capacities. Example applications have shown superior and promising characteristics for a wide range of industrial applications.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for manufacturing a nanomaterial, comprising:
   a first electrode;
   a second electrode spaced apart from the first electrode by a gap;
   a chamber configured to enclose the first electrode, the second electrode, and a liquid;
   a power supply configured to provide electrical energy to at least one of the first electrode and the second electrode and is configured to provide a pulse electric output to at least one of the first electrode or the second electrode, wherein a pulse duration of the pulse electric output is greater than or equal to 10 nanoseconds and smaller than or equal to 40 nanoseconds; and
   a pump configured to cause the liquid to flow through the gap between the first electrode and the second electrode.

2. The system of claim 1, wherein the second electrode is arranged parallel to the first electrode.

3. The system of claim 1, wherein the first electrode comprises an elongate member having a fixed end and a free end.

4. The system of claim 1, wherein the second electrode comprises one of an elongate member or a flat member.

5. The system of claim 4, wherein the flat member comprises one of a pad or a plate.

6. The system of claim 3, wherein the elongate member comprises one of a rod or a needle.

7. The system of claim 3, wherein the pump configured to cause the liquid to flow continuously through the gap between the first electrode and the second electrode, in a direction from the fixed end to the free end.

8. The system of claim 1, wherein a power of the pulse electric output is greater than or equal to one megawatt.

9. The system of claim 1, wherein a pulse frequency of the pulse electric output is greater than or equal to 100 Hz.

10. The system of claim 1, wherein the pulse electric output is configured to cause a plasma pulse in the liquid to generate a plurality of carbon particles in the liquid.

11. The system of claim 10, wherein an average dimension of the plurality of carbon particles is between 0.5 nm and 1.5 nm.

12. The system of claim 10, wherein the plurality of carbon particles include a diamond core covered by at least one graphene cap.

13. The system of claim 12, wherein the at least one graphene cap is symmetrically located relative to the diamond core.

14. The system of claim 13, wherein the plurality of carbon particles are configured to be used as at least one of an additive to a solar panel for increasing efficiency; an additive to a luminescence marker for medical use; an additive to a luminophore for a quantum-dot display and a light source; or an additive to a paint, a coating, or a plastic for absorbing ultraviolet radiation.

15. The system of claim 12, wherein the at least one graphene cap is asymmetrically located relative to the diamond core.

16. The system of claim 15, wherein the plurality of carbon particles are configured to change a viscosity of a lubricant when included as an additive to the lubricant.

17. The system of claim 10, wherein the plurality of carbon particles and the liquid form a dispersion.

18. The system of claim 13, wherein the plurality of carbon particles are configured to be used as at least one of an antifriction additive to a lubricant; a wear-reduction agent to the lubricant; an antioxidating agent to the lubricant; or an additive for increasing thermal conductivity to the lubricant, a cooling liquid, or a polymer.

19. The system of claim 1, wherein the gap is greater than or equal to 0.3 millimeters and smaller than or equal to 3 millimeters.

20. The system of claim 1, wherein the pump is further configured to drive the liquid to flow through the gap against a direction of erosion of the first electrode.

21. The system of claim 1, wherein the pump is further configured to drive the liquid to flow through the gap to remove gas bubbles.

22. The system of claim 1, wherein the liquid comprises an organic substance.

23. The system of claim 22, wherein the organic substance comprises a benzene ring.

24. The system of claim 1, wherein the liquid is an organic fluid.

25. The system of claim 1, wherein the pump is coupled to a liquid source and is further configured to inject liquid from the liquid source into the chamber.

26. The system of claim 1, wherein the chamber further comprises an inlet and an outlet.

27. The system of claim 26, wherein the pump is coupled to the inlet and the outlet and is configured to drive the liquid to flow from the inlet to the outlet.

28. The system of claim 1, further comprising:
- a capacitor electrically coupled to the power supply; and
- an inductor electrically coupled to an end of the capacitor and one of the first electrode or the second electrode.

* * * * *